US 9,152,695 B2

(12) United States Patent
Tibrewal et al.

(10) Patent No.: US 9,152,695 B2
(45) Date of Patent: Oct. 6, 2015

(54) GENERATION OF METADATA AND COMPUTATIONAL MODEL FOR VISUAL EXPLORATION SYSTEM

(71) Applicant: Intelati, Inc., Palo Alto, CA (US)

(72) Inventors: Pankaj Tibrewal, Palo Alto, CA (US); Jeremy Pitten, Bath (GB); Thierry Schang, Mountain View, CA (US); Deepak Alur, Fremont, CA (US)

(73) Assignee: Intelati, Inc., Palo Alto, CA (US)

( * ) Notice: Subject to any disclaimer, the term of this patent is extended or adjusted under 35 U.S.C. 154(b) by 0 days.

(21) Appl. No.: 14/468,925

(22) Filed: Aug. 26, 2014

(65) Prior Publication Data
US 2015/0066930 A1 Mar. 5, 2015

Related U.S. Application Data

(60) Provisional application No. 61/870,977, filed on Aug. 28, 2013.

(51) Int. Cl.
*G06F 3/048* (2013.01)
*G06F 17/30* (2006.01)
*G06F 3/0481* (2013.01)
*G06F 3/0484* (2013.01)

(52) U.S. Cl.
CPC ...... *G06F 17/30598* (2013.01); *G06F 3/04815* (2013.01); *G06F 3/04847* (2013.01); *G06F 17/30554* (2013.01); *G06F 17/30572* (2013.01)

(58) Field of Classification Search
None
See application file for complete search history.

(56) References Cited

U.S. PATENT DOCUMENTS

| | | | |
|---|---|---|---|
| 5,423,033 A | 6/1995 | Yuen | |
| 5,555,354 A * | 9/1996 | Strasnick et al. | 345/427 |
| 6,366,299 B1 | 4/2002 | Lanning et al. | |
| 6,404,437 B1 * | 6/2002 | Russell et al. | 345/473 |
| 6,707,454 B1 | 3/2004 | Barg et al. | |
| 6,750,864 B1 * | 6/2004 | Anwar | 345/440 |
| 6,774,914 B1 | 8/2004 | Benayoun | |
| 7,373,612 B2 | 5/2008 | Risch et al. | |
| 7,730,059 B2 | 6/2010 | Behnen et al. | |
| 8,001,155 B2 | 8/2011 | Danton et al. | |
| 8,010,909 B1 | 8/2011 | Hanson et al. | |
| 8,660,977 B2 * | 2/2014 | Bechtel et al. | 706/50 |
| 8,830,225 B1 * | 9/2014 | Karakotsios et al. | 345/419 |
| 2002/0129017 A1 | 9/2002 | Kil et al. | |
| 2002/0184260 A1 | 12/2002 | Martin et al. | |
| 2003/0142136 A1 | 7/2003 | Carter et al. | |
| 2004/0027350 A1 * | 2/2004 | Kincaid et al. | 345/440 |

(Continued)

OTHER PUBLICATIONS

"Into the third dimension", This Month Points of View, Nature Method, 2012.*

(Continued)

*Primary Examiner* — Hung Le
(74) *Attorney, Agent, or Firm* — Raubvogel Law Office

(57) ABSTRACT

Various mechanisms are described for generating metadata describing relationships among data sets. Quantitative data can be analyzed to determine relationships, and metadata representing the determined relationships can then be stored. Visualizations can then be generated from the metadata, and a navigational model can be defined based on the generated set of visualizations. The navigational models can provide robust visual mechanics for implementing intuitive navigational schemes that facilitate interaction with data on any suitable output device, include small screens as found on smartphones and/or tablets.

25 Claims, 20 Drawing Sheets

(56) References Cited

U.S. PATENT DOCUMENTS

| | | |
|---|---|---|
| 2005/0030309 A1 | 2/2005 | Gettman et al. |
| 2006/0218563 A1* | 9/2006 | Grinstein et al. .............. 719/328 |
| 2008/0022228 A1 | 1/2008 | Kwon et al. |
| 2009/0018996 A1* | 1/2009 | Hunt et al. ........................ 707/2 |
| 2009/0033660 A1 | 2/2009 | Levene et al. |
| 2009/0158214 A1 | 6/2009 | Arnold et al. |
| 2010/0011309 A1* | 1/2010 | Mitra et al. .................... 715/768 |
| 2010/0031165 A1* | 2/2010 | Lindquist ....................... 715/757 |
| 2010/0169836 A1 | 7/2010 | Stallings et al. |
| 2010/0309228 A1 | 12/2010 | Mattos et al. |
| 2011/0131209 A1* | 6/2011 | Bechtel et al. ................. 707/737 |
| 2011/0307834 A1 | 12/2011 | Wu |
| 2012/0133652 A1 | 5/2012 | Stallings et al. |
| 2012/0191704 A1* | 7/2012 | Jones ............................ 707/722 |
| 2012/0200567 A1* | 8/2012 | Mandel et al. ................. 345/420 |
| 2013/0097563 A1 | 4/2013 | Pacheco Rodrigues Velho et al. |
| 2013/0185642 A1 | 7/2013 | Gammons |
| 2013/0346911 A1 | 12/2013 | Sripada |
| 2014/0040810 A1 | 2/2014 | Haliburton et al. |
| 2014/0053070 A1* | 2/2014 | Powers et al. ................. 715/708 |
| 2014/0258938 A1* | 9/2014 | Christmas et al. ............. 715/849 |
| 2015/0049082 A1* | 2/2015 | Coffey et al. .................. 345/420 |

OTHER PUBLICATIONS

Lars Bodum, "Design of a 3D virtual geographic interface for access to geoinformation in real time", 2004.*

* cited by examiner

FIG. 3

GENERATION OF METADATA AND COMPUTATIONAL MODEL FOR VISUAL EXPLORATION SYSTEM

CROSS-REFERENCE TO RELATED APPLICATION

The present application claims priority from U.S. Provisional Application Ser. No. 61/870,977 for "Organizing and Visually Exploring Hierarchical Data," filed Aug. 28, 2013, which is incorporated by reference herein in its entirety.

The present application is related to U.S. Utility application Ser. No. 14/468,933 for "Multi-Faceted Navigation of Hierarchical Data," filed on the same date as the present application, which is incorporated by reference herein in its entirety.

TECHNICAL FIELD

The present document relates to graphical displays of quantitative data.

DESCRIPTION OF THE RELATED ART

Data is often stored in relational databases, and often viewed via a SQL query. The result of such a SQL query is a flat file; a user reviews and explores the data in such flat files by traversing the rows and columns representing the result. Various techniques, including reporting and charting tools, exist for visualizing and disseminating information from such flat files.

For example, in the area of business intelligence and data warehousing, it is known to provide tools to generate reports. A business user requests a report to a central team, which then implements code to prepare reports (which may include charts); these reports are then sent back to the requesting user. Such a process can be slow and cumbersome, and can often require multiple back-and-forth communications with the central team.

More recently, the field of visual analytics has seen the emergence of products that attempt to improve the process of exploring data in a graphical manner through charts. However in many cases, the resulting products are still difficult to use, require specific training, and are effectively limited in use by a few data analysts.

One tool that has been used widely is a pivot table, which is a data summarization tool that can automatically sort, count a total, calculate an average, group information, or perform other operations on data stored in a table or spreadsheet, such as Microsoft Excel, available from Microsoft Corporation of Redmond, Wash. Results are usually displayed in a second table, called a pivot table. Pivot tables can be used, for example, to group information along chosen categories (also referred to as dimensions) and display the resulting computations.

However, none of the existing techniques adequately provides a mechanism for quickly generating and navigating visually compelling representations of data presented as a flat file. In particular, such data presentations can be challenging to navigate on devices such as smartphones and tablets, which may have limited screen size and/or navigational ability.

SUMMARY

Various embodiments provide mechanisms to facilitate visual exploration of quantitative data coming from various sources; such sources can include, for example and without limitation, databases, enterprise applications, software-as-a-service applications, locally stored data (such as data stored in a spreadsheet), and/or the like. In particular, in at least one embodiment, the system allows visual exploration of combinations of data from these and/or other sources.

The system described herein provides any of a number of features and functions, which can be implemented singly or in any suitable combination. Examples of such features include new mechanisms to analyze data, visualize information, disseminate it to interested parties, and/or facilitate discussion around a set of visualizations. Various embodiments provide functionality by which users can explore flat files by going through a hierarchy of charts. The mechanisms described here are particularly convenient for navigating, organizing, and exploring data on a device with limited screen space such as a smartphone or tablet with touch interfaces instead of a keyboard, although the techniques can be used in connection with any suitable computing device. These mechanisms therefore promote the democratization of data analysis to more individuals, within or between enterprises and/or individuals.

In at least one embodiment, the system and method described herein provide mechanisms for generating metadata describing relationships among data sets. For example, quantitative data can be analyzed to determine relationships, and metadata representing the determined relationships can then be stored. Visualizations can then be generated from the metadata, and a navigational model can be defined based on the generated set of visualizations. The navigational models can provide robust visual mechanics for implementing intuitive navigational schemes that facilitate interaction with data on any suitable output device, including small screens as found on smartphones and/or tablets.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 3 is an example of a screen forming part of an interface for user input according to one embodiment.

DETAILED DESCRIPTION OF THE EMBODIMENTS

In at least one embodiment, the system described herein generates metadata for use in providing a computational model and unified user interface for visualizing, navigating, and interacting with quantitative data.

The techniques described herein can be implemented on any suitable electronic device or combination of devices. In at least one embodiment, the system is implemented in a network-connected environment, wherein several devices communicate with one another over a network such as the Internet. In at least one embodiment, the system is implemented in a web application context, wherein connectivity takes place via a browser, app, or other software for transferring data from one location to another. In such an embodiment, the system may operate in a client/server context, wherein client machines request data from one or more servers, and servers provide the data in response to such requests. The logic for organizing, maintaining, disseminating, and interacting with such data can be client-based, server-based, or some combination of the two.

One skilled in the art will recognize that the generation of metadata and the multifaceted visual interaction/exploration mechanisms described herein can be implemented separately or in any suitable combination with one another.

System Architecture

According to various embodiments, the system can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1A:
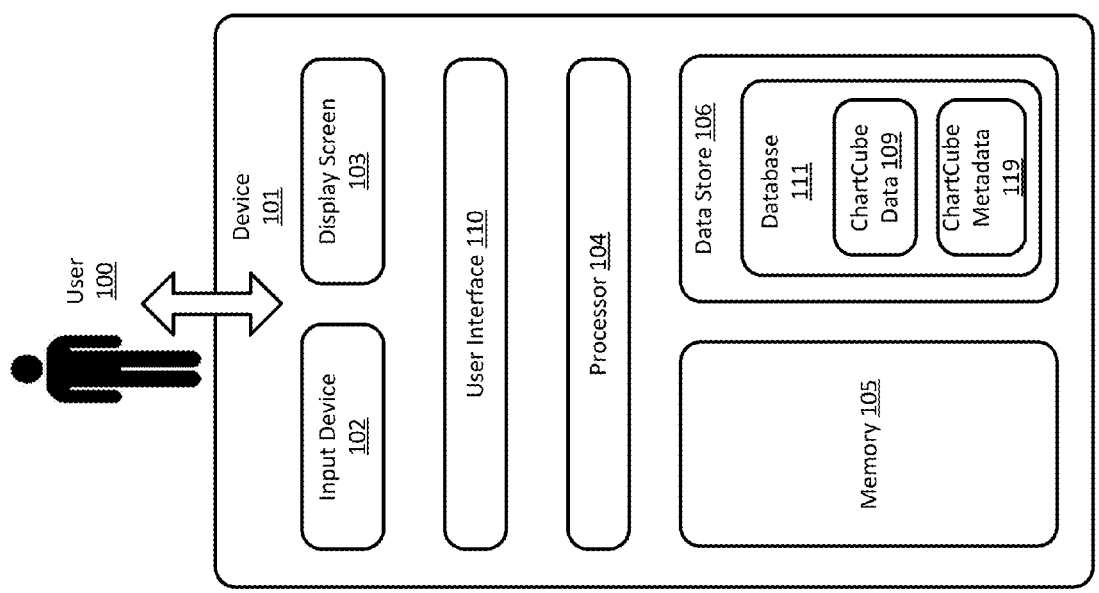
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer, tablet, smartphone, or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include one or more databases, referred to collectively as a database 111, containing data that can be utilized and/or displayed according to the techniques described herein. In another embodiment, database 111 can be stored elsewhere, and data therefrom can be retrieved by device 101 when needed for presentation to user 100. Database 111 may include one or more data sets, which may be used for a variety of purposes and may include a wide variety of files, metadata, and/or other data. In at least one embodiment, the database 111 may include data and metadata used in presenting interactive visualizations according to the techniques described herein; such data and metadata are referred to as ChartCube data 109 and ChartCube metadata 119, respectively.

Display screen 103 can be any element that graphically displays information such as data from database 111, and/or the results of steps performed on such data to provide information useful to a user. Such output may include, for example, raw data, data visualizations, navigational elements, graphical elements drawing attention to data visualizations or graphical elements, queries requesting confirmation and/or parameters for information identification, display, or presentation, and/or the like. Additionally or alternatively, display screen 103 may display data in a wide variety of formats, including but not limited to charts, tables, animations, graphs, reports, and/or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

In at least one embodiment, device includes user interface 110 for presenting data from database 111 to user 100 (on display screen 103), and for receiving input from user 100 (via input device 102) for interacting with such data. Such user interface 110 can include, for example, tools for navigating, interacting with, editing, and/or annotating displayed data. In particular, as described herein, user 100 can provide input, such as a selection from a menu containing a variety of options, or activation of an on-screen control such as a button, or gesture operation, to determine the various characteristics of the information presented on display screen 103, such as the type, scope, and/or format of the information to be displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary.

In at least one embodiment, data store 106 is detachable in the form of a CD-ROM, DVD, flash drive, USB hard drive, or the like. The database 111 can be entered from a source outside of device 101 into a data store 106 that is detachable, and later displayed after the data store 106 is connected to device 101. In another embodiment, data store 106 is fixed within device 101.

Figure 1B:
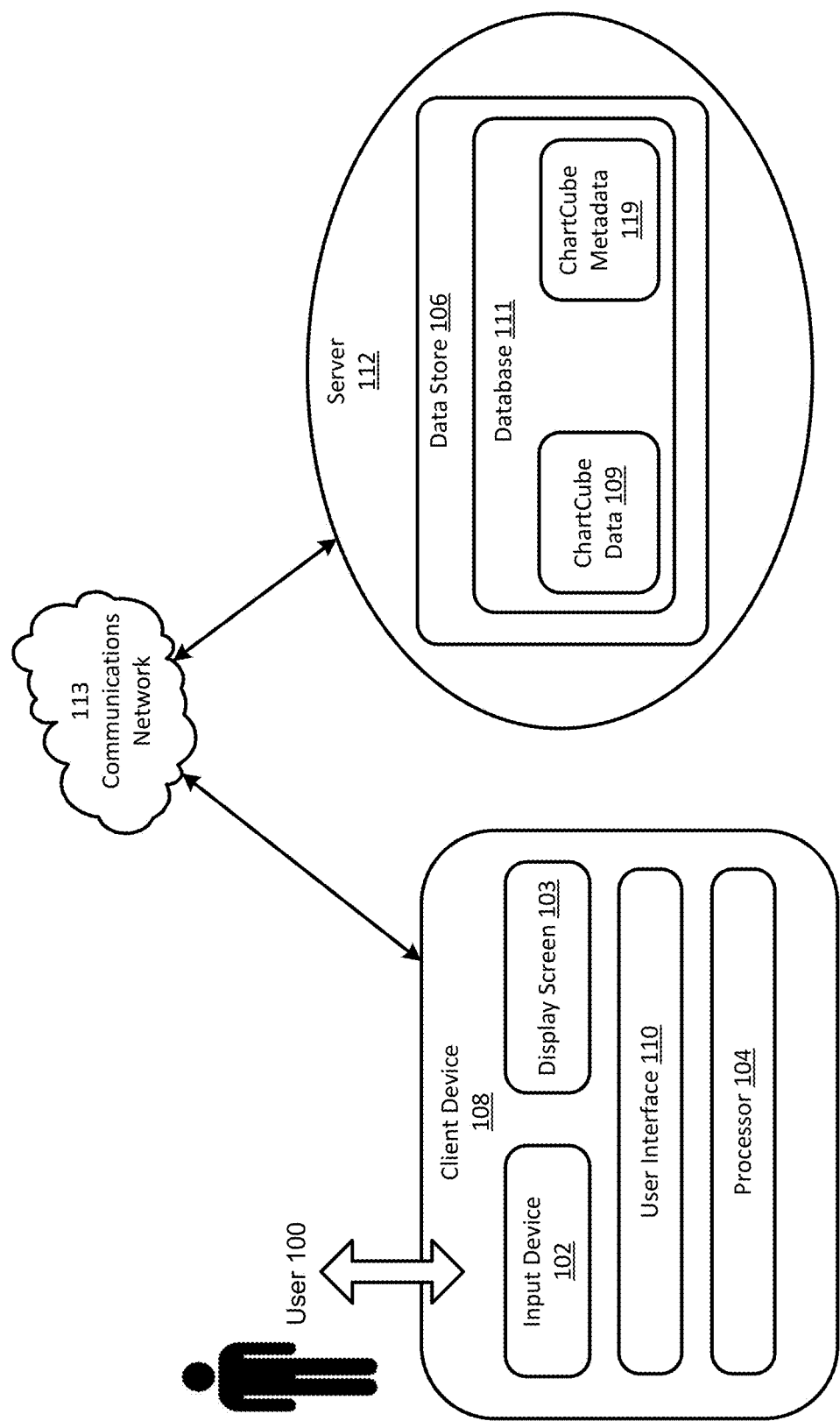
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 112. Items from the database 111, reports, and/or other data derived from the database 111 can be presented as part of such web pages and/or other web-based resources, using known protocols and languages such as Hypertext Markup Language (HTML), Java, JavaScript, and the like. Alternatively, client device 108 can run any other type of software application, or "app", for causing device 108 to interact with server 112, and for permitting the user 100 to view and interact with displayed data via input device 102 and display screen 103.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 112, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 112 containing the requested data.

In this implementation, server 112 is responsible for data storage and processing, and incorporates data store 106 for storing database 111. Server 112 may include additional components as needed for retrieving data and/or database 111 from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, database 111 is organized in a file system within data store 106. Appropriate indexing can be provided to associate particular documents with particular quantitative data elements, reports, other documents, and/or the like. Database 111 may include any of a wide variety of data structures known in the database arts. As in FIG. 1A, database 111 may include one or more data sets, which may include ChartCube data 109, ChartCube metadata 119, and/or other data (not shown).

ChartCube data 109 and/or ChartCube metadata 119 can be retrieved from client-based or server-based data store 106, and/or from any other source. In at least one embodiment, input device 102 is configured to receive data entries from user 100, to be added to data store 106. User 100 may provide such data entries via the hardware and software components described above according to means that are well known to those skilled in the art. Server 112 may be connected to several client devices 108 that are used by various individuals of the enterprise, and may thus store ChartCube data 109 and/or ChartCube metadata 119 from multiple users and/or multiple client devices 108. ChartCube data 109 and/or ChartCube metadata 119 may be used to generate various reports, which may, for example, be viewed on display screen 103 of client device 108.

Display screen 103 can be any element that graphically displays information such as items from database 111, and/or the results of steps performed on such items to provide information useful to a user. Such output may include, for example, raw data, data visualizations, navigational elements, graphical elements drawing attention to data visualizations or graphical elements, queries requesting confirmation and/or parameters for information identification, display, or presentation, or the like. Additionally or alternatively, display screen 103 may display data in a wide variety of formats, including but not limited to charts, tables, animations, graphs, reports, and/or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to viewing, annotating, navigating, and/or modifying data. In particular, as described herein, user 100 can provide input, such as a selection from a menu containing a variety of options, to determine the various characteristics of the information presented such as the type, scope, and/or format of the information to be displayed on display screen 103.

Processor 104 can be a conventional microprocessor for performing operations on data under the direction of software, according to well-known techniques. Memory 105 can be random-access memory, having a structure and architecture as are known in the art, for use by processor 104 in the course of running software. As described above in connection with FIG. 1A, in at least one embodiment, client device 108 includes user interface 110 for presenting data from database 111 to user 100 (on display screen 103), and for receiving input from user 100 (via input device 102) for interacting with such data.

In at least one embodiment, the system can be implemented as software written in any suitable computer programming language, whether in a standalone or client/server architecture. Alternatively, it may be implemented and/or embedded in hardware.

Figure 2:
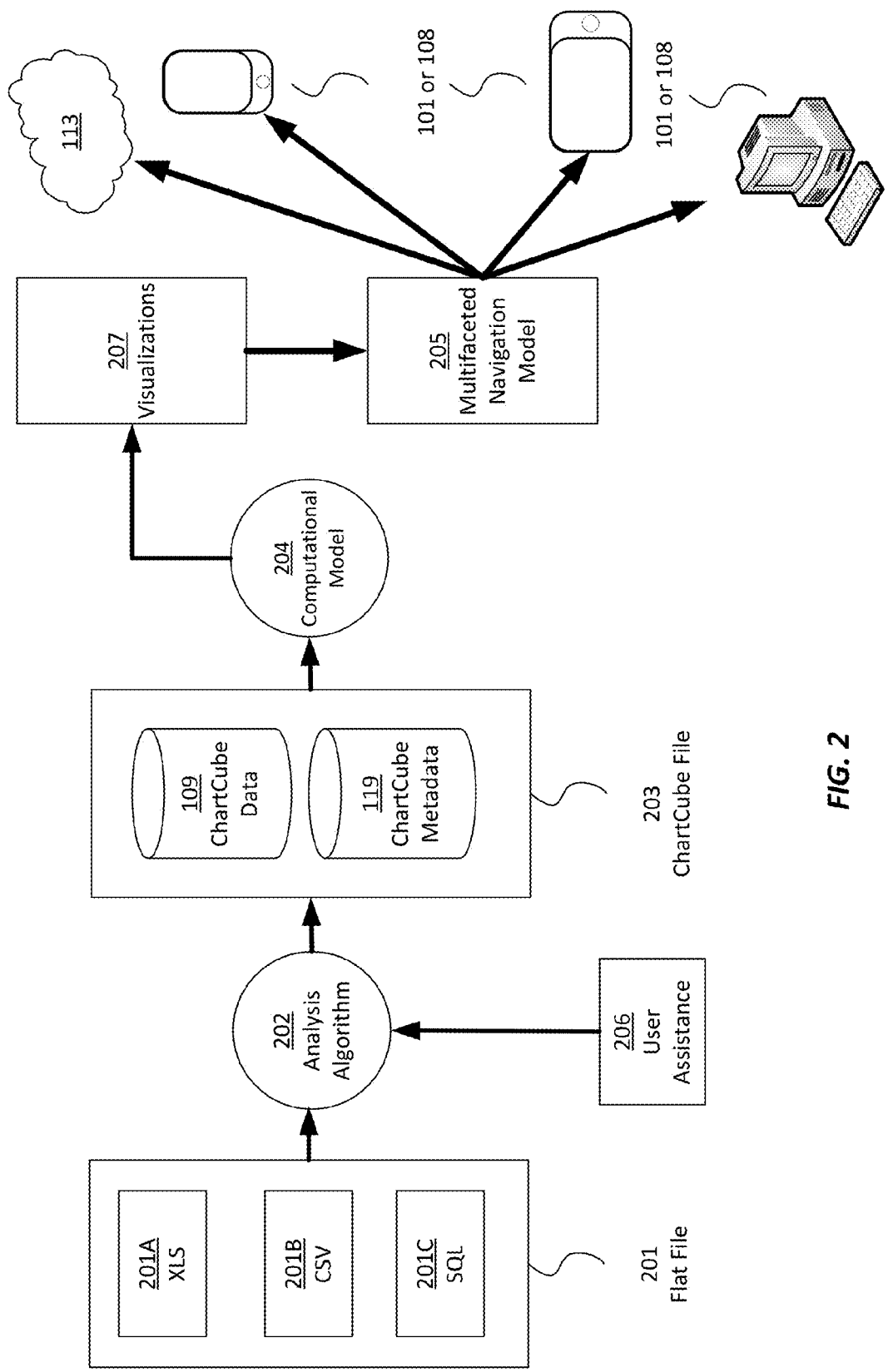
FIG. 2 depicts an overall conceptual architecture according to one embodiment.

Referring now to FIG. 2, there is shown an overall conceptual architecture according to one embodiment.

In at least one embodiment, the system analyzes data coming from a flat file 201 or other suitable source, and determines characteristics of the data based on column organization and values present in each column. In at least one embodiment, the flat file 201 or other data source may be any of the following, either singly or in any combination:

an Excel document (XLS) 201A;
a comma-separated-values (CSV) file 201B;
a SQL result 201C;
a non-SQL result;
output of a data service or web service;
or the like.

The system determines what column will be used as dimensions (or categories) and which ones will be used as metrics (or values). In at least one embodiment, these determinations are performed automatically by an analysis algorithm 202, possibly with user assistance 206.

In at least one embodiment, analysis algorithm 202 also automatically determines hierarchical relationships among the columns. Hierarchical relationships are automatically identified, for example, when different columns represent categories that are increasingly detailed: for example, a geographical location hierarchy can be identified by the presence of three columns with successively narrower geographic distinctions, such a Region, Country, City; as another example, a product catalog hierarchy can be identified by columns such as product-category->product->product SKU. Other types of relationships can also be automatically determined by analysis algorithm 202, such as peer-level relationships in which two or more columns are considered to be at the same level of detail.

In at least one embodiment, analysis algorithm 202 performs these automatic determinations based on data and learned behaviors; user assistance 206 can be provided as well. The result of these steps is an organizational schema referred to as a ChartCube file 203, which includes ChartCube data 109 and ChartCube metadata 119 in a format referred to herein as the ChartCube format. Once generated by analysis algorithm 202, ChartCube file 203 is stored, for example in data store 106, for later use.

In at least one embodiment, a computational model 204 uses the ChartCube data 109 and ChartCube metadata 119 to determine a set of visualizations 207 the user 100 will be able to explore.

In at least one embodiment, a multifaceted visual navigation model 205 is defined from visualizations 207; navigation model 205 allows user 100 to easily and interactively explore the different dimensions and metrics of the data in various ways. Users 100 can interact with multifaceted navigation model 205 to explore the data in various ways that exploit the hierarchical relationships among data elements. Navigation according to model 205 can be operated on any suitable computing device 101, 108 and is specifically well suited to mobile devices having smaller screen and touch-based interfaces. In at least one embodiment, navigation according to model 205 is made available via a cloud-based application infrastructure, over communications network 113.

In at least one embodiment, navigational model 205 is augmented by the ability to describe insights attached to visualizations 207, to easily disseminate the resulting insights to others, to bookmark relevant data, to comment on data, and/or to collect comments from other viewers. A reviewer of data can go back to a bookmark and comment left by the author and explore further to provide additional insights.

By providing the above-described functions and features, either singly or in any suitable combination, the system described herein provides several advantages over prior techniques. Such advantages include, for example:

The automated and assisted creation of ChartCube file 203 saves time and effort on the part of the user;
ChartCube file 203 provides a mechanism for automatically displaying more relevant charts more frequently;
Navigation model 205 allows users to navigate the multidimensional space more intuitively and more effectively; and
The integrated bookmarking and commenting capability accelerate functions such as dissemination and feedback, and provide mechanisms for keeping data, visualizations, and insights all in a single place.

Each of the following components will be described in turn:

Analysis algorithm 202
ChartCube file 203
Computational model 204
Multifaceted navigation model 205

Analysis Algorithm 202

Figure 4:
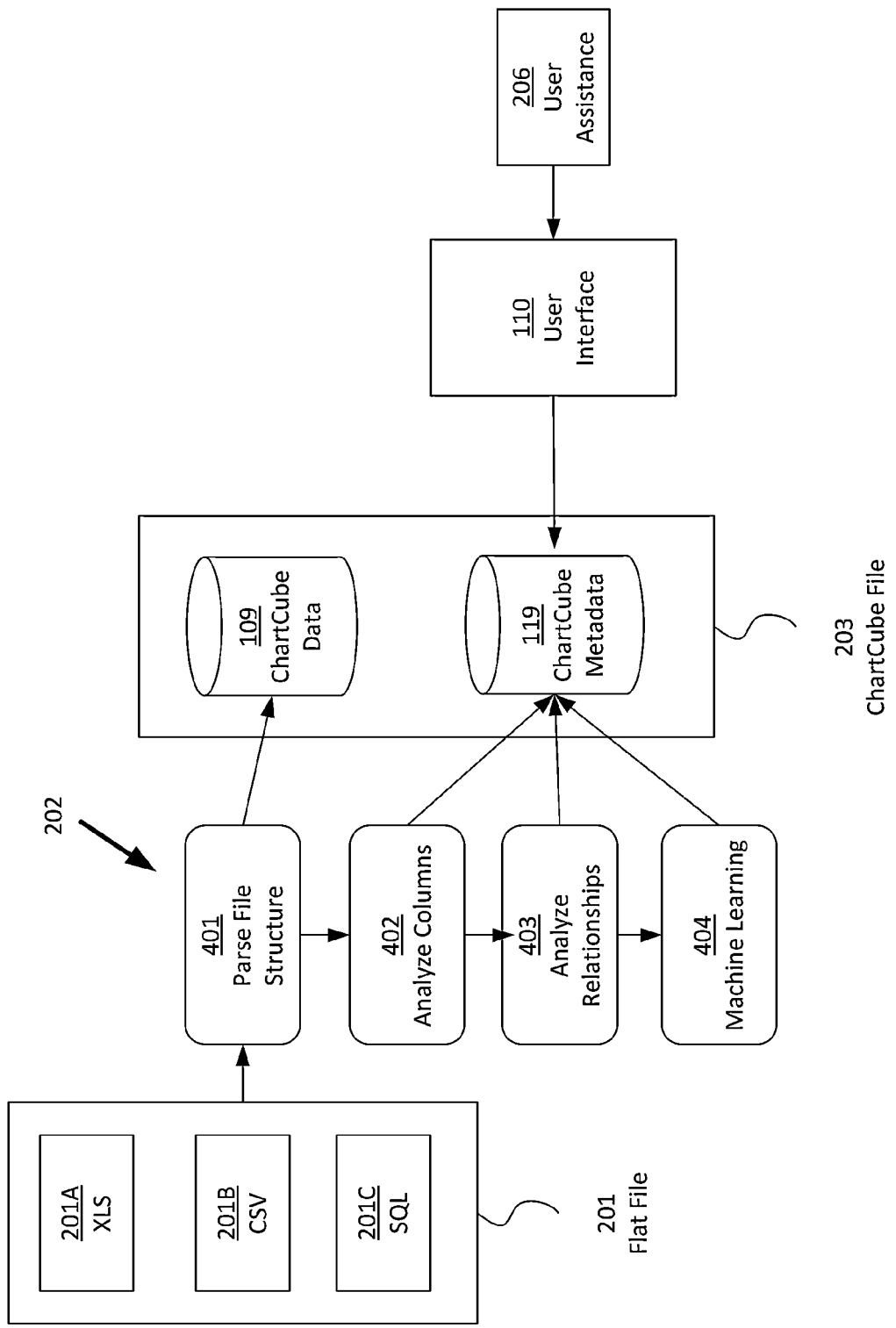
FIG. 4 is a flow diagram depicting a method for generating metadata according to one embodiment.

Referring now to FIG. 4, there is shown a flow diagram depicting a method for generating ChartCube metadata 119, as it may be performed by analysis algorithm 202 according to one embodiment.

Analysis algorithm 202 takes as its input flat file 201, which may include, for example, Excel document (XLS) 201A, comma-separated-values (CSV) file 201B, and/or SQL result 201C. The system parses 401 the file structure from the input file 201, to extract the column names, column values, and type information (when available, such as for an Excel document 201A).

Analyze Columns 402

The system then analyzes 402 each column independently and determines characteristics such as the following:

the name of the column;
the type of the column (number, text, date);
the subtype such as text:enumeration, number:currency, number:percent;
the format of the data (number of decimals, currency format, and/or the like).

A set of rules is applied to determine additional metadata that may not be found in the data itself but which may be useful to decide how to display a chart or other graphical representation. This additional metadata may include, for example and without limitation, the default aggregation function (sum or average), the default sort order, the default time ranges (such as week, month, year, etc.), and/or the like.

Example rules are as follow:
For numbers and currencies columns:
    The default aggregation function is addition.
    The default format as numbers and currency respectively.
For percentages:
    The default aggregation function is average.
    The default format is percentages.
For number columns:
    By default, it is assumed that "bigger is better". This information can later be used to format charts where low-performing dimensions are highlighted automatically.
    If the column name includes negative terms such as "defects", "loss", etc, then it is assumed that "smaller is better".
    Sort order can be selected as ascending or descending, based on such analysis.
For dates:
    The period for each the data is shown in charts is assumed by assessing the time range in the data:
    If the time range is less than 4 months: the current period is last week, and the trending period is entire data (shown by week)
    If the time range is between 4 and 24 months: the current period is last month, and the trending period is last twelve months (shown by month)
    If the time range is more than 24 months: the current period is last quarter, and the trending period is last three years (shown by quarter)

One skilled in the art will recognize that the above rules are merely exemplary, and that the step of analyzing 402 columns can include application of any suitable rules in any suitable combination. ChartCube metadata 119 can then be updated to reflect the analysis.

Analyze Relationships 403

In at least one embodiment, analysis algorithm 202 continues by analyzing 403 relationships among columns, based on any available information. In at least one embodiment, this is performed by analyzing two columns at a time, although other methodologies can be used wherein more columns are analyzed simultaneously. ChartCube metadata 119 can then be updated to reflect the determined relationships.

Any suitable technique can be used for detecting relationships. For example, if the system determines that a number is a division of two fields, the default aggregation function is changed to a weighted average with the denominator column as the base. For example, if the header has a name that says "sales growth" and there is another column which has "sales", then the metric is aggregated by weighted average using "sales" as the base. Other relationships can be detected as well, such as a determination that there is a one-to-one relationship between two fields, or a one-to-many relationship between two fields. Further relationships can be detected by making intelligent interpretations of time periods involved (for example, by looking at the time period for which the data is available).

Figure 7:
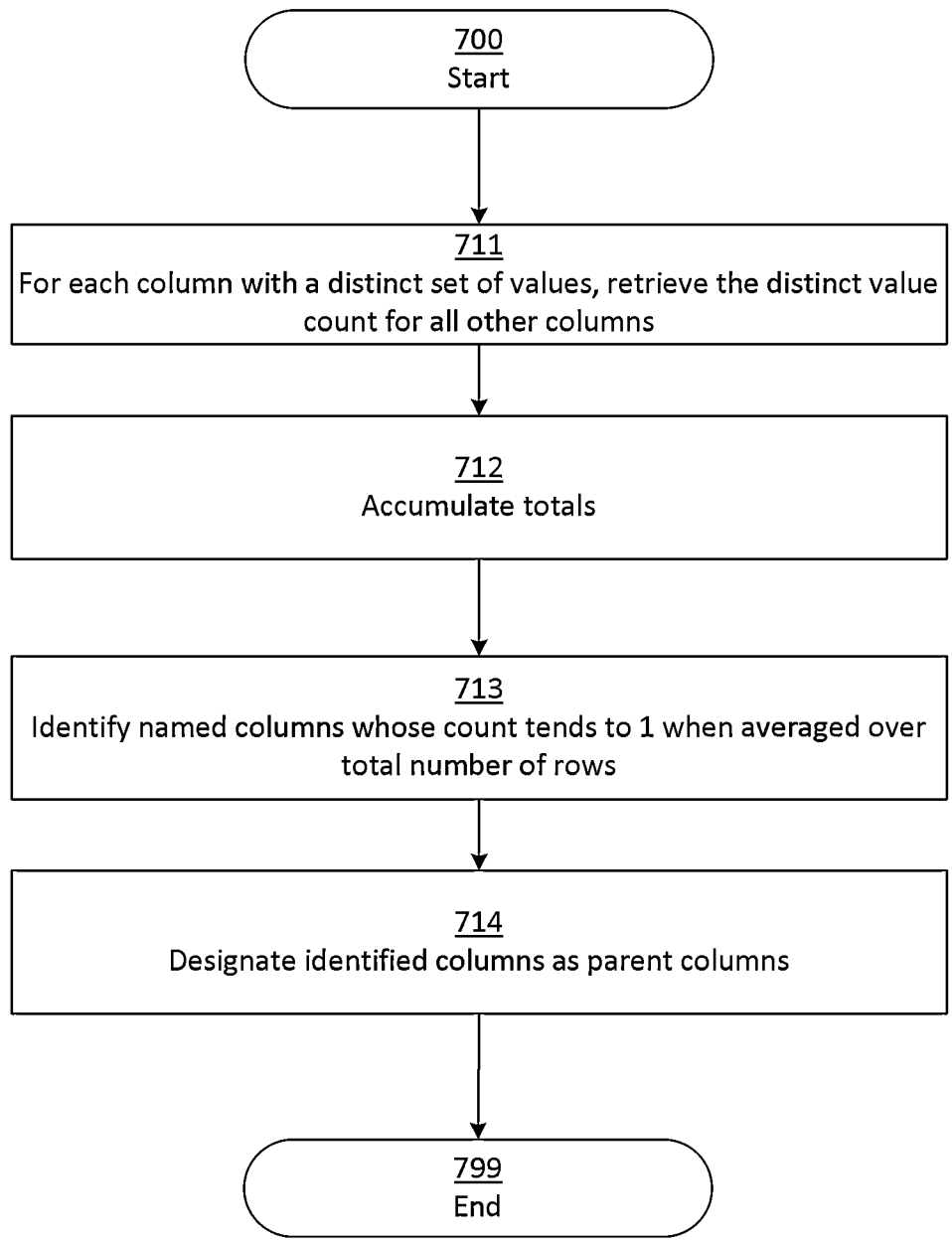
FIG. 7 is a flow diagram depicting an example of an algorithm for identifying relationships between columns, according to one embodiment.

Referring now to FIG. 7, there is shown a flowchart depicting an example of an algorithm for identifying relationships between columns, according to one embodiment. The algorithm detects one-to-many relationships between columns, wherein a one-to-many relationship represents any ancestral relationship such as parent-child, grandparent-child, great-grandparent-child, and the like. In at least one embodiment, the algorithm proceeds as follows. For each column with a distinct set of values, the distinct value count is retrieved 711 for all other columns. The result is an iterable list of distinct counts of values for each column; this is referred to as distinctCounts. Totals are then accumulated 712, and those named columns whose count tends to 1 when averaged over the total number of rows are identified 713. The identified columns are designated 714 as parent columns, since for a given set of column values the parent column maps to a single value. If the accumulated count was greater than 1, it indicates no correlation or a possible child correlation.

The following is an example of an algorithm as set forth in FIG. 7. One skilled in the art will recognize that other mechanisms may be provided for extracting relationships among data elements.

```
SUBROUTINE buildRelationships ( chartcubeId, distinctColumns )
    relationships = [ ]
    FOR each column in distinctColumns
        CALL distinctCounts
            WITH chartcubeId AND column AND columns
            RETURNING distinctCounts
        distinctColumnCounts [ ] = 0
        FOR distinctCount in distinctCounts
            distinctColumnCounts [distinctCount.columnIndex] +=
                distinctCount.count
        END FOR
        FOR each columnIndex in distinctColumnCounts
            distinctColumnCount =
                distinctColumnCounts[columnIndex]
            averageDistinctColumnCount =
                distinctColumnCount / distinctCounts
            IF averageDistinctColumnCount == 1 THEN
                // then we have a parent node. .
                // we have allowed rounding at this point,
                // so we check if there
                // might be a many to many relationship
                parent = columns[columnIndex]
                relationship = new Relationship(parent, column);
                relationships.add(relationship)
                IF distinctColumnCount > distinctCounts THEN
                    relationship.many2Many = true
                END IF
            END IF
        END FOR
    END FOR
    RETURN relationships;
END
SUBROUTINE distinctCounts ( chartcubeId, groupByColumn, columns )
    CALL getDistinctValuesForColumns
        WITH chartcubeId AND groupByColumn AND columns
    RETURNING distinctValuesForColumns
    distinctCounts = [ ]
    FOR columnIndex in distinctValuesForColumns
        distinctValuesForColumn =
            distinctValuesForColumns[columnIndex]
        FOR distinctValues in distinctValuesForColumn
            INIT distinctCount
            distinctCount.columnIndex = index
            distinctCount.count = distinctValues.length
            distinctCounts.add(distinctCount)
        END FOR
    END FOR
    RETURN distinctCounts
END
SUBROUTINE getDistinctValuesForColumns (
            chartcubeId, groupByColumn, columns )
    CALL getRows WITH chartcubeId RETURNING rows
    distinctValuesForColumns = [ ]
    FOR columnIndex in columns
        distinctValuesForColumns[columnIndex] = [ ]
    END FOR
    FOR column in columns
        CALL getDistinctValues
            WITH rows AND groupByColumn AND column
            RETURNING distinctValues
        distinctValuesForColumns[column] = distinctValues
    END FOR
    RETURN distinctValuesForColumns
END
SUBROUTINE getDistinctValues ( rows, groupByColumn, column)
```

```
// note this subroutine can be performed by a database
// query using a groupBy clause
groupValueMap = [ ]
// iterate over the rows and identify distinct values for the
// given groupByColumn and populate a hash map to record
// distinct values for the other column
FOR row in rows
    groupByValue = row[groupByColumn]
    groupValueMap[groupByValue] = [ ]
END FOR
// now iterate over the rows again to identify
// distinct values for the other column for each
// distinct groupBy column value
FOR row in rows
    groupByValue = row[groupByColumn]
    columnValue = row[column]
    values = groupValueMap[groupByValue]
    IF values contains value
    ELSE
       values.add(value)

END FOR
// finally convert the hash map of distinct values
// into an array of distinct values
FOR groupValue in groupValueMap
    values = groupValueMap[groupValue]
    distinctValues.add(values)
END FOR
RETURN distinctValues
END
```

Once relationships have been identified, they are analyzed 403 to detect metadata; if any metadata can be generated to represent the relationships, the metadata is stored in Chart-Cube metadata 119.

As discussed, any number of relationships can be automatically identified, including one-to-many, one-to-one, and/or many-to-many relationships. In at least one embodiment, one-to-many relationships may be assumed to represent hierarchies. Examples include cascading one-to-many relationships (for example, country-state-city). Similar dimensions can be used in multiple hierarchies (for example, country-state-city and city type-city).

In at least one embodiment, if a one-to-one relationship is identified (such as, for example, country code-country), one of the elements may be excluded as being redundant. A user can specify which element to exclude, for example by performing a drag-and-drop operation; alternatively such determination can be made automatically. For example, in at least one embodiment, if one of these elements is text and another is a number, the numerical column is excluded.

In at least one embodiment, all dimensions that are not a part of any hierarchy are assumed to be independent dimensions.

In at least one embodiment, for a given set of column/pair relationships, a hierarchy tree of relationships is built. It is possible that the list of relationships may contain one or more instances of a relationship which is the reverse of another relationship, for example where a parent/child relationship between entities is reversed. In such a situation, in at least one embodiment, one or both of these relationships is discarded.

Figure 9:
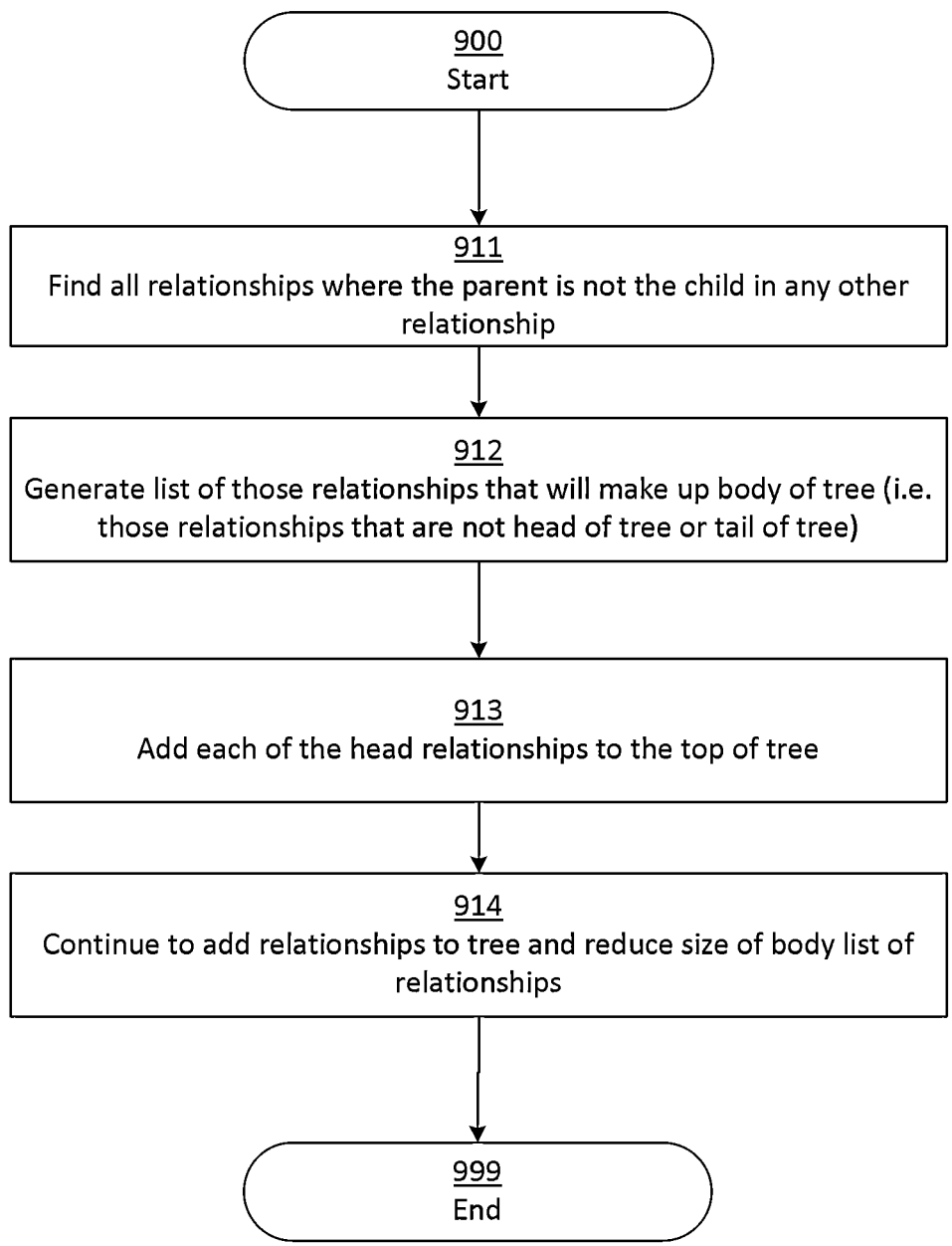
FIG. 9 is a flow diagram depicting an example of an algorithm for building a hierarchy tree, according to one embodiment.

Referring now to FIG. 9, there is shown a flowchart depicting an example of an algorithm for building a hierarchy tree, according to one embodiment. In at least one embodiment, the algorithm proceeds as follows. The first step is to find 911 all relationships where the parent is not the child in any other relationship. A list is generated 912 of those relationships that will make up the body of tree (i.e. those relationships that are not the head of the tree or the tail of the tree). Each of the head relationships is added 913 to the top of the tree. Then, a loop is entered wherein relationships continue to be added 914 to the tree, reducing the size of the body list of relationships at each iteration; this loop continues until the body list is empty.

The following is an example of an algorithm as set forth in FIG. 9. One skilled in the art will recognize that other mechanisms may be provided for building a hierarchy tree.

```
SUBROUTINE buildHierarchyTree ( relationships )
    INIT tree
    CALL discardCyclicRelationships
        WITH relationships RETURNING relationships
    CALL findHeads WITH relationships RETURNING heads
    IF heads isNotEmpty
        body = [ ];
        body.addAll(relationships);
        FOR relationship in heads
            Column parent = relationship.getParent( );
            IF !tree.hasChild(parent)
                tree.addChild(parent)
            END IF
        END FOR
        WHILE body isNotEmpty
            CALL getTails WITH tree RETURNING tails
            FOR tail in tails
                leaf = tail.getNode( )
                CALL findChildren
                    WITH leaf AND tree AND body
                    RETURNING children
                FOR relationship in children
                    tail.addChild(relationship.getChild( ))
                END FOR
            END FOR
            CALL findContained
                    WITH tree AND body
                    RETURNING contained
            IF contained isEmpty
                // so we failed to remove any relationships
                // in this pass, we should now check if any
                // relationships which we could not
                // add previously because they had other
                // ancestors not yet in the tree
                FOR relationship in body
```

```
            parents =
                tree.find(relationship.getParent( ));
            IF parents isNotEmpty
                FOR parent in parents
                    leaf = parent.getNode( )
                    CALL findChildren
                        WITH leaf AND tree AND body
                        RETURNING children
                    FOR relationship in children
                        parent.addChild(
                            relationship.getChild( ));
                    END FOR
                END FOR
            END IF
        END FOR
        CALL findContained
            WITH tree AND body
            RETURNING contained
        IF contained isEmpty
            throw Exception
                WITH "Unable to grow hierarchy tree"
        END IF
      ENDIF
      body.removeAll(contained)
    }
  ELSE IF relationships isNotEmpty
    throw Exception
        WITH "Unable to detect hierarchy tree root"
  END IF
  RETURN tree
END
SUBROUTINE discardCyclicRelationships ( relationships )
  list = [ ]
  list.addAll(relationships);
  FOR relationship in relationships
      CALL findReverseRelationship
            WITH relationship AND relationships
            RETURNING reverse
      IF reverse NOT NULL
        IF relationship.isMany2Many( )
            list.remove(relationship)
        END IF
        IF reverse.isMany2Many( )
            list.remove(reverse)
        END IF
        IF rel.isOne2Many( ) AND reverse.isOne2Many( )
            list.remove(relationship);
            list.remove(reverse);
        END IF
      END IF
  END FOR
  RETURN list
END
// for a given parent-child relationship find a reverse of this
// relationship, where parent is child and child is parent
SUBROUTINE findReverseRelationship(relationship, relationships)
    FOR next in relationships
    IF next.getChild( ) == relationship.getParent( )
        IF(next.getParent( ) == relationship.getChild( )
            return next;
        END IF
    END IF
    END FOR
    RETURN NULL
END
// Return a list of those relationships where the
// parent column is never a child in a relationship.
SUBROUTINE findHeads ( relationships )
  heads = [ ]
  FOR relationship in relationships
    column = relationship.getParent()
    IF !isChild(column, relationships))
      heads.add(relationship)
    END IF
  END FOR
  RETURN heads
END
// Return a list of leaf nodes for a given hierarchy tree
SUBROUTINE getTails ( tree )
```

```
        tails = [ ]
        RETURN tree.root.getTails( tails )
END
// For a given column, which is a leaf in a given tree,
// find in the given list of relationships
// any relationships which are direct children of the leaf.
// Return a list of relationships, where the child in the
// relationship should be added to
// the tree as children of the given tree leaf.
SUBROUTINE findChildren ( leaf, tree, body )
    children = [ ]
    // iterate over the list of relationships
    // for each relationship, if the parent column
    // matches the leaf column
    // then we assess the child column to see if it is a suitable
    // direct child node of the leaf.
    FOR next in relationships
        IF next.getParent( ) == leaf
            child = next.getChild( )
            // assess whether this child column is suitable
            // to be added as a direct child node
            // first retrieve a list of all relationships in
            // the list where the column is the
            // child in the relationship
            CALL findAncestorRelationships
                    WITH child AND relationships
                    RETURNING ancestors
            // if only a single relationship is found we
            // know that this child column can be added
            // to the tree as a child of the leaf, however,
            // if there is more than one relationship then
            // we need to determine if all of the
            // parent columns are already part of the tree.
            // We know one of the parents is already in the
            // tree, it is the leaf column passed into
            // this method. If more than one of the parents
            // is not already included the tree then it
            // implies that the child has other dependents
            // not yet part of tree and so it should not
            // yet be added, so we exclude it from the list
            // of relationships to return.
            // We only include those relationships where
            // there is a single parent child relationship
            // not yet included in the tree.
            IF ancestors.size( ) >1
                // more than one ancestor relationships,
                // remove from this ancestor list those
                // relationships which are already modeled
                // in the tree.
                // if only one item remains in the ancestors
                // list then we know this item
                // can be returned as one suitable to append
                // to the tree leaf
                parentsInTree = [ ]
                FOR nextAncestor in ancestors
                    parent = nextAncestor.getParent( )
                    IF leaf != parent && tree contains parent
                        parentsInTree.add(nextAncestor)
                    }
                }
                ancestors.removeAll(parentsInTree);
            }
            if(ancestors.size( ) == 1) {
                children.add(ancestors.get(0));
            }
        }
    }
    RETURN children
END
SUBROUTINE findAncestorRelationships ( child, relationships )
    ancestors = [ ]
    FOR next in relationships
        IF next.getChild( ) == child
            ancestors.add(next)
        END IF
    END FOR
    RETURN ancestors
END
// For a given list of relationships find any of
```

```
// those relationships which
// which can be found within the given tree.
// A relationship is considered found if the
// parent child relationship is
// found between a parent and child tree node
// or between a ancestor and child,
// e.g. between a grandparent and child or
// great grandparent and child.
//
// Return a list array of find relationships
SUBROUTINE findContained ( tree, body )
    contained = [ ]
    FOR relationship in relationships
        parents = tree.find(rel.getParent( ))
        IF parents isNotEmpty
            FOR parentNode in parents
                children =
                    parentNode.find(relationship.getChild( ))
                IF children isNotEmpty
                    contained. add(relationship)
                    break;
                END IF
            END FOR
        END IF
    END FOR
    RETURN contained
END
```

In at least one embodiment, user interface 110 allows users to modify the results of the above-described algorithms, for example to specify additional relationships, or to modify or remove those relationships automatically identified by the algorithms. User interface 110 can be adapted for use by any suitable users, such as for example end users, IT personnel, software-as-a-service application administrators, and/or the like.

Figure 3:
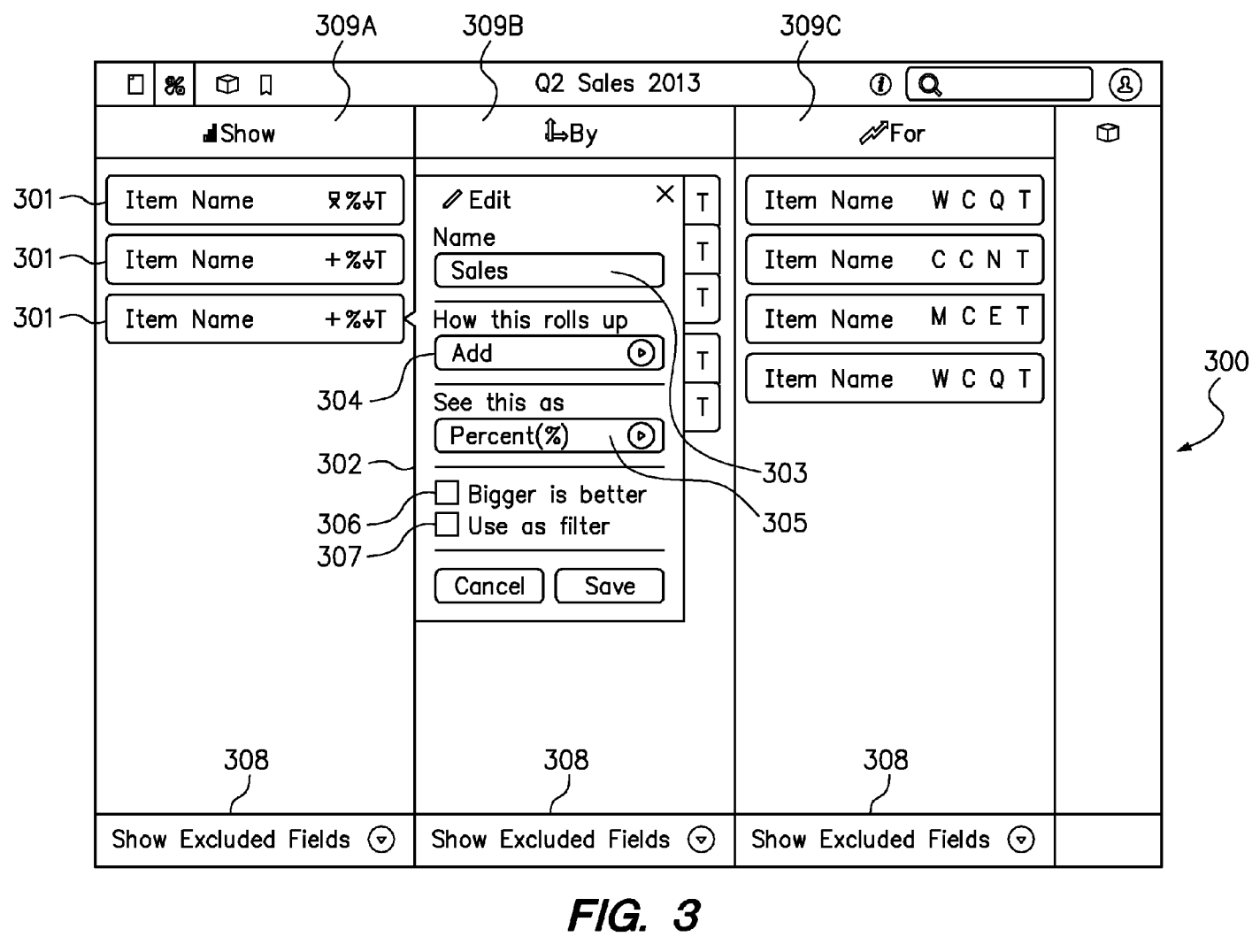

Referring now to FIG. 3, there is shown an example of a screen 300 forming part of user interface 110 for user input according to one embodiment. In particular, screen 300 allows a user to specify which items should be shown, how they are to be named and classified, what hierarchical (and/or non-hierarchical) relationships exist in the dimensions, how the data is aggregated along the hierarchical dimensions, and/or how users would prefer to see the data visually including the sequence of the various items. In various embodiments, users can drag and drop fields to exclude/include items in the particular instantiation, tap and move items to change the sequence, drag an item on top of another item to create a parent-child relationship and tap the items to tweak the settings including how the data is aggregated. Section 309A, labeled "Show", allows the user to specify which metrics are to be shown; section 309B, labeled "By", allows the user to specify dimensions; and section 309C, labeled "For", allows the user to specify dates and other parameters.

Screen 300 includes a number of elements 301, each representing an item that can be displayed. User 100 can click on one of the elements 301 to see pane 302 for editing the element 301. In pane 302, user 100 can perform operations such as the following:
  change the name by typing in field 303;
  specify how the element rolls up to higher-level elements in the hierarchy, by selecting from pop-up menu 304;
  specify how the element should be displayed, by selecting from pop-up menu 305;
  specify whether a larger value is desirable by checking or unchecking box 306;
  specify whether the element should be used as a filter, by checking or unchecking box 307.

User 100 can also click on Show Excluded Fields button 308 to see additional elements that may have previously been omitted or hidden from the display.

One skilled in the art will recognize that the particular arrangement and layout shown in FIG. 3 is merely exemplary, and that user interface 110 can take any other suitable form.
Machine Learning 404

In at least one embodiment, the system includes machine learning 404 capability, so that algorithm 202 includes applying such machine learning to learn from observed user actions and input. Results of machine learning 404 can be used for refining algorithm 202 for specific data sets and specific users. As an example, if user 100 reclassifies an item as a dimension that was originally identified by algorithm 202 as a metric, algorithm 202 learns and identifies this item as a dimension when the next version of the input file is uploaded.

In at least one embodiment, any of three levels of machine learning 404 can be provided, singly or in any combination. At a first level, the system can suggest or decide relationships and/or interpretations of data based on previous actions by the same user on the same spreadsheet and column name. At a second level, the system can suggest or decide relationships and/or interpretations of data based on previous actions by the user on other documents or spreadsheets, for example after determining that there is some similarity between the present data and the previously manipulated data, or some other basis for making such extrapolations. At a third level, the system can suggest or decide relationships and/or interpretations of data based on previous actions by other user(s) on documents or spreadsheets, for example after determining that there is some similarity or affinity between the other user(s) and the present user; for example, such other user(s) may be part of the same organization as the present user, or may have expressed similar preferences or behaviors in the past. Suitable combinations of these various levels of machine learning 404 (and/or other levels) can be used, for example based on a determined level of confidence that appropriate extrapolations can be made based on available data.

Figure 5:
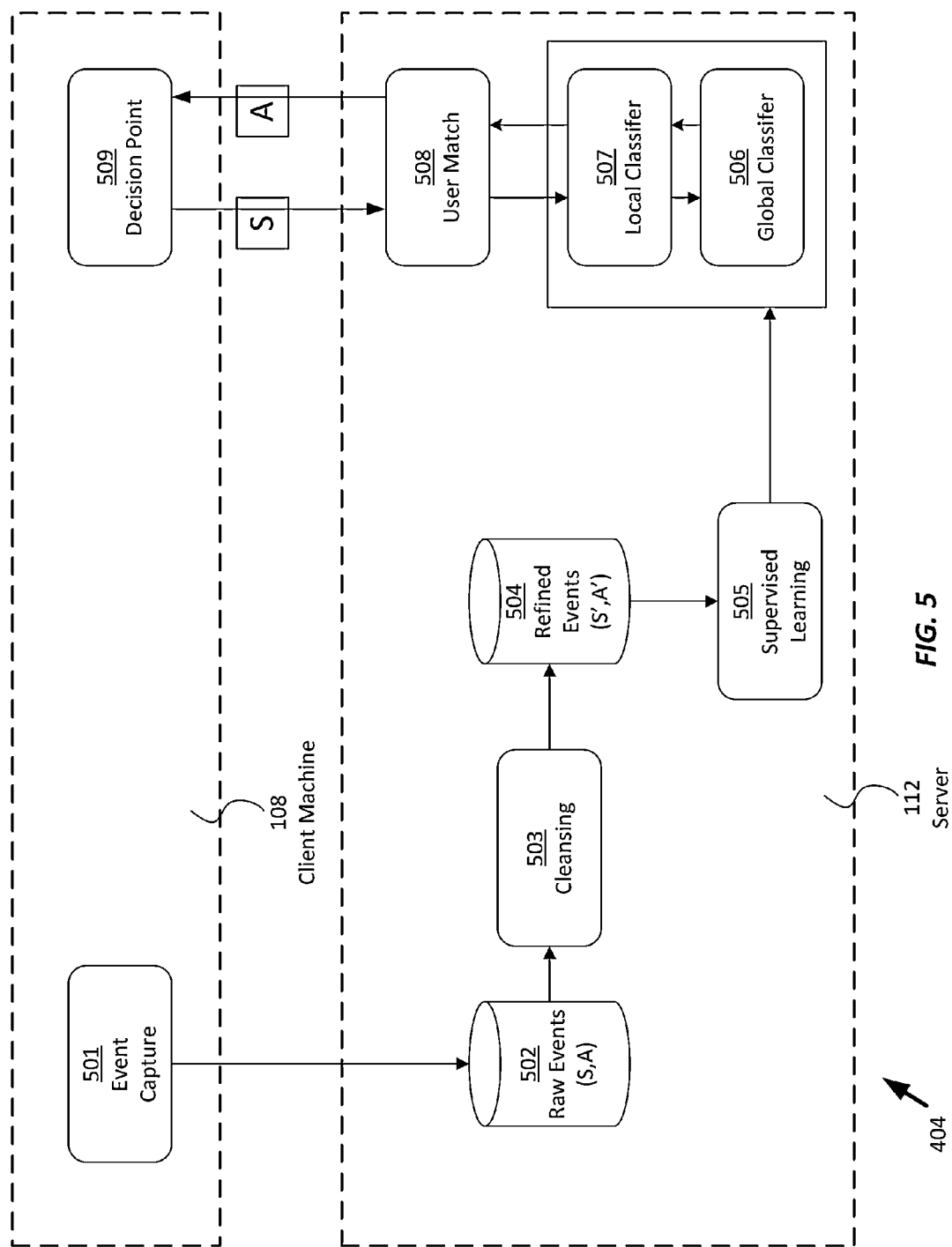
FIG. 5 is a flow diagram depicting a machine learning method according to one embodiment.

Referring now to FIG. 5, there is shown a flow diagram depicting a machine learning method 404 according to one embodiment. In at least one embodiment, machine learning 404 is modeled as a set of Situation-Action pairs. A Situation is a set of spreadsheet and user characteristics and their values at the time a user performs a specific configuration action. The Action is a set of characteristics and values that describe the action and/or allow subsequent reproducibility of the action.

Accordingly, as shown in FIG. 5, in at least one embodiment, machine learning algorithms 404 include capturing 501 a set of events (represented as Situation-Action pairs), and storing representations of such pairs in a central database 502. Event capture 501 can take place via any suitable means, for example by observing user actions and/or other events, particularly with respect to requests for and manipulations of data.

In at least one embodiment, a cleansing operation 503 can be performed on the stored Situation-Action pairs, for example to remove redundancy and/or prioritize based on determined relevance. The result is a stored set of refined events 504. Any of a number of supervised machine learning algorithms 505 can be applied to the refined data 504 to derive a set of classifiers, which can include user classifier(s) 507 (specific to a particular user 100) and/or global classifier(s) 506 (which apply to all users 100). These classifiers 506, 507 can be stored, for example in a database or other data store (not shown), for later use in determining what action to perform in response to a particular situation. Examples of such techniques include decision tree algorithms such as ID3, C4.5, C5, or any other supervised learning technique(s).

Subsequently, when applied to a new situation (represented by a decision point 509), classifiers 506, 507 are applied to the situation indicated by the decision point 509 and determine the best action to perform. If a user match 508 is found, then specific user classifiers 507 can be used for greater accuracy. In at least one embodiment, a confidence factor can also be determined, so that only those actions with confidence factors greater than a defined threshold are applied.

For illustrative purposes, FIG. 5 depicts machine learning 404 as taking place in a client/server environment, with event capture 501 and decision point 509 occurring at client machine 108, while other steps take place at server 112. However, other arrangements are possible.

ChartCube File 203

As described above, the result of application of analysis algorithm 202 is ChartCube data 109 and ChartCube metadata 119, collectively referred to as a ChartCube file 203, which has a format referred to herein as the ChartCube format. In at least one embodiment, ChartCube metadata 119 encodes various relationships, including for example hierarchical and/or non-hierarchical (peer-level) relationships, among data elements, as determined according to the techniques described above.

Any suitable format can be used for storing ChartCube data 109 and ChartCube metadata 119. In at least one embodiment, ChartCube file 203 encapsulates various pieces of information, including for example various hierarchies in the data (such as country-state-city or family-product-SKU), how the various metrics roll up (for example, by adding, averaging, or the like), how metrics are to be displayed (for example, number, currency, or the like), what the period of review is, and/or any other suitable information.

In at least one embodiment, an option is provided wherein the system generates a ChartCube file 203 from any suitable data source, using a manual definition of the metadata and thereby bypassing algorithm 202. In at least one embodiment, an application can include an "export to ChartCube" function that performs such a function.

Any suitable file format can be used for storing ChartCube metadata 119. One example of a file format includes the following data fields and can easily be represented in a JSON format or any other suitable format:

| ChartCube Metadata top level definition | | | |
|---|---|---|---|
| Name | Path | Type | Description |
| id | id | String | Universal Unique Identifier, UUID for ChartCube, assigned on creation, identical to id field on ChartCube Object |
| uri | uri | String | ChartCube Metadata Universal Resource Identifier |
| rowCount | rowCount | int | The number of rows in the ChartCube source tabular data set |
| columns | columns | Object Array | An array of worksheet column definitions |
| fields | fields | Object | A JSON object encapsulating worksheet column field categories of dimensions, metrics and dates. |
| relationships | relationships | Object | An array of zero or more column relationships, where a relationship represents a correlation between 2 columns. |
| hierarchies | hierarchies | Object | An array of zero or more column hierarchies, where a hierarchy represents a parent child correlation between 2 or more columns. |

| ChartCube columns definition | | | |
|---|---|---|---|
| Name | Path | Type | Description |
| name | columns[i].name | String | The name of a column |
| type | columns[i].type | int | The type of column, NUMERIC (0), TEXT (1), DATE (9), BOOLEAN(3) |
| index | columns[i].index | int | The column index. |
| format | columns[i].format | String | Optional column format. |

-continued

| ChartCube fields definition | | | |
|---|---|---|---|
| Name | Path | Type | Description |
| dimensions | fields.dimensions | Object | A JSON object encapsulating the worksheet column fields categorized as dimensions |
| metrics | fields.metrics | Object | A JSON object encapsulating the worksheet column fields categorized as metrics |
| dates | fields.dates | Object | A JSON object encapsulating the worksheet column fields categorized as dates |
| included | fields.dimensions.included fields.metrics.included fields.dates.included | Object Array | An array of objects, each object represents a worksheet column included in the parent category, where the categories are dimensions, metrics and dates |
| excluded | fields.dimensions.excluded fields.metrics.excluded fields.dates.excluded | Object Array | An array of objects, each object represents a worksheet column excluded from the parent category, where the categories are dimensions, metrics and dates. |
| name | included[i].name excluded[i].name | String | The name of a column to include or exclude from this category |
| index | included[i].index excluded[i].index | int | The index of a column to include or exclude from this category |
| show | included[i].show | String | Only used for dates fields, value is "Entire Period" or |
| from | included[i].from | Date | |
| to | included[i].to | date | |

| ChartCube relationships definition | | | |
|---|---|---|---|
| Name | Path | Type | Description |
| parent | relationships[i].parent | int | The column index of the parent |
| child | relationships[i].child | int | The column index of the child |
| one2Many | relationships[i].one2Many | boolean | TRUE if the relation is one to many, otherwise the relationship is many to many |

| ChartCube hierarchies definition | | | |
|---|---|---|---|
| Name | Path | Type | Description |
| name | hierarchies[i].name | String | The given name of the hierarchy |
| indices | Hierarchies[i].indices | int | The type of column, NUMERIC (0), TEXT (1), DATE (9), BOOLEAN(3) |

| ChartCube Surface Metadata: Captures the information necessary to render one specific surface of the cube | | |
|---|---|---|
| Name | Type | Description |
| cubeId | String | Unique Id for the ChartCube |
| format | String | Number format to use for display: Options are "number", "percentage", "currency" |
| rollUp | String | Type of aggregation function to use: Options are "sum", "avg", "count", "weighted" |
| chartType | String | Type of chart that was displayed: Options are "bar", "column", "pie", "line", ... |
| sortOrder | String | As-is \| Ascending \| Descending |
| selectedMetrics | Array of Column Ids | Selected metrics, typically 1, but we allow for more in the future. List of columns Id's that can be looked up in the Metadata |
| selectedDimensions | Array of Column Ids | Selected dimensions, typically 1, but we allow for more in the future. List of columns Id's that can be looked up in the Metadata |
| drilldowns | Array of Drilldown elements | Selected drill downs, 0 or more. Each drill down element contains the column Id and the expression name value pair to build the drill down filter query |

| ChartCube Data Definition: The data is represented | | |
|---|---|---|
| Name | Type | Description |
| data | Array Array | An array of arrays or tuples. Each contained array represents a table row. |
| row | Primitive Array | An array of primitive values representing a table row. The values can be any valid JSON type. |

Computational Model 204

Once ChartCube data 109 and ChartCube metadata 119 have been stored in ChartCube file 203, computational model 204 is applied, to generate various views of the data for presentation to user 100.

In at least one embodiment, computational model 204 performs various calculations on ChartCube data 109 and ChartCube metadata 119. Such calculations can include, for example: determining the value of metrics at each level for the dimensions (e.g., sales for Houston, sales for Texas, and sales for the United States); using the sequence of metrics, dimensions and dates to calculate values for "next metric for the same dimension", "same metric for the next dimension", "same metric and same dimension but drill down to the next level for the dimension"; and/or the like. In at least one embodiment, computational model 204 also runs an algorithm to determine appropriate chart types to be displayed in response to certain actions or commands by user 100. For example, such an algorithm can indicate which charts or displays to show in response to commands such as "show me the time trend", "add a dimension to see a metric by two dimensions", and/or the like.

Any suitable mechanism can be used for navigating among various views of the data. One such mechanism is described in a later section of this document; however, one skilled in the art will recognize that any other suitable navigation mechanism can be used.

Figure 6:
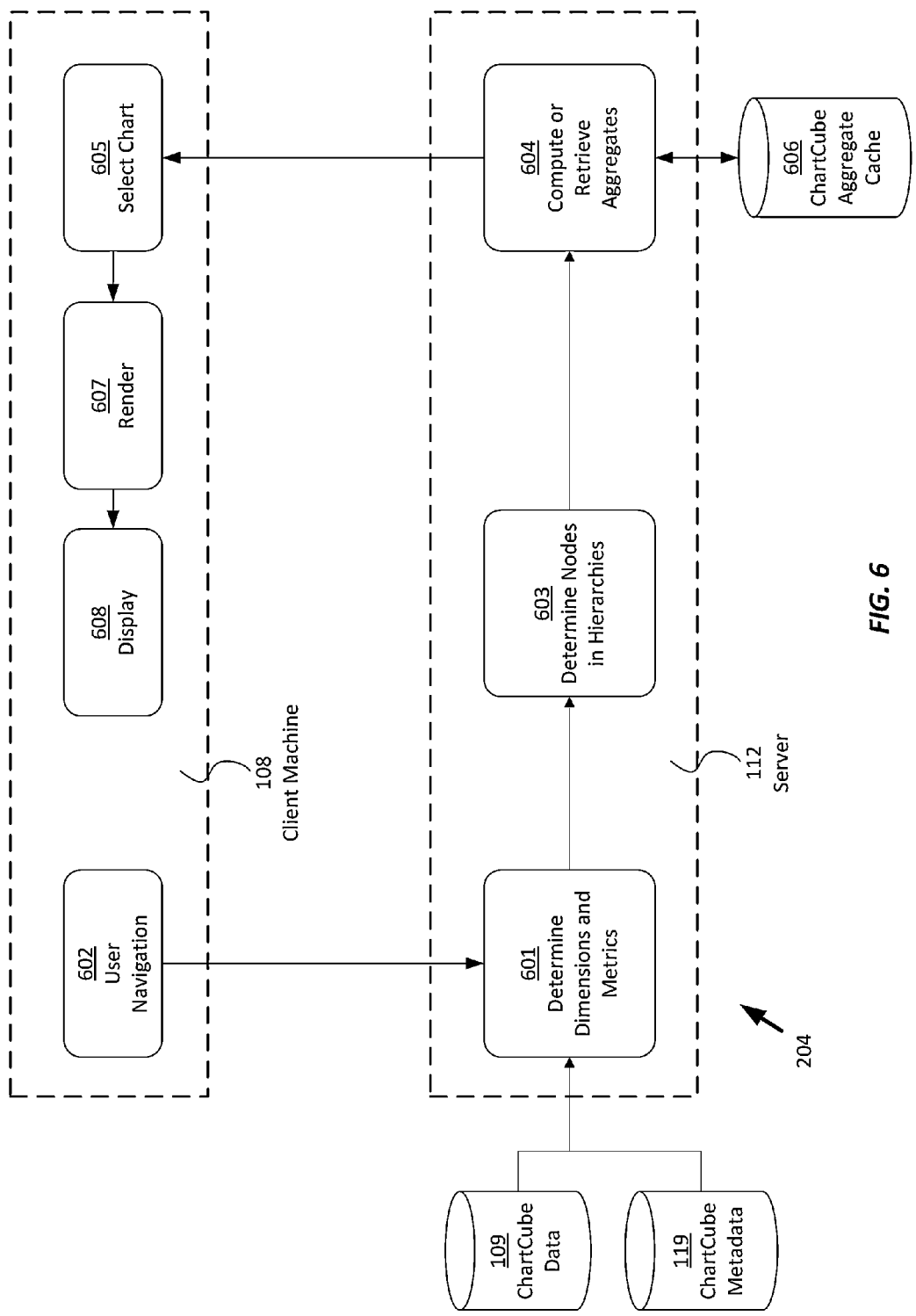
FIG. 6 is a flow diagram depicting a method for implementing a computational model according to one embodiment.

Computational model 204 can take any suitable form. Referring now to FIG. 6, there is shown an example of a method for implementing computational model 204 according to one embodiment, to generate data-ready views for presentation to user 100.

For illustrative purposes, FIG. 6 depicts computational model 204 as taking place in a client/server environment, with part of the computation being done on server 112, while another part of the computation is done on client device 108. However, other arrangements are possible.

Computational model 204 takes, as its inputs, ChartCube data 109 and ChartCube metadata 119. It determines 601 dimensions and metrics, and can also determine other information such as for example dates. In at least one embodiment, such determination 601 is performed in response to user navigation 602, which is interpreted as a request for particular information. For example, the user may directly select the metric and dimension, or can trigger a "next dimension" action, in which case the next dimension in the metadata is selected. The user may also indicate preferences as part of the selected request; such preferences can specify, for example, ordering data, filtering a subset of data, specifying a different aggregation function, adding a secondary dimension for a richer graph, and/or selecting variations on the type of chart (such as, for example, time-based trending as opposed to a categorical bar chart).

Once dimensions and metrics have been determined 601 based on user navigation 602, nodes in hierarchies are determined 603. For each value in a selected dimension, a node is created and all rows having this value are linked to the node.

Then, for each node, aggregates are computed or retrieved 604. In at least one embodiment, this step includes aggregating metric values from all the rows using the aggregated function as defined in the metadata or as selected by the user. When a filter is provided by the user, only those rows in the filter are aggregated. In addition, in at least one embodiment, the aggregation function is also applied to all metric values for all selected rows to determine the total aggregate for the data set.

In at least one embodiment, aggregates are stored in a cache 606, so that they can later be retrieved without the need for repeating computations when the same chart is requested by the user.

Client device 108 obtains a response from server 112 that includes the ChartCube data and aggregates as determined in step 604. Client device 108 then selects 605 an appropriate chart type to display; alternatively, such selection can be made at server 112 and transmitted to client device 108. In at least one embodiment, chart selection is performed based on rules that may be statically defined or dynamically discovered through a machine learning algorithm as described above. The selected chart is then rendered 607 and displayed 608 to user 100.

In at least one embodiment, selection 605 of a particular chart type for each metric and dimension is performed based on an understanding of the data (taking into account, for example, the format of the data, how the metric is aggregated, number of data points at each node, the aggregated value of the data at each node, and/or the like). In at least one embodiment, options in the initial set are bar, column, pie, and candlestick, although any other suitable chart format can be used.

Below are examples of static rules that can be used to define the chart type:

For numbers and currency:
    Use column chart by default.
    Use pie if one element is greater than 30% of the aggregated value.
    Use column chart if the number of data points is greater than 10.
    Use bar chart if the number of data points is less than 4.

For percentages:
    Use candlestick by default
    Use pie if sum of all the data is 100% at each node
    Use bar chart with dotted line at 100% if 80% of data between 80% and 120%

When a secondary dimension is selected by the user (e.g., Sales by Country is seen as Sales by Country by Product)
    Column chart is changed to stacked column chart
    Bar chart is changed to stacked bar chart
    Pie and Candlestick charts are changed to stacked column chart When the chart is changed to a trend chart, a line or area chart is created where period for trending is included and the data is shown by the appropriate value (this can be changed on the fly by the user)
    Pie and Candlestick charts are changed to stacked area chart
    Bar and Column charts are changed to stacked line chart
    When the trending button is tapped on a chart with one metric and two dimensions, the secondary dimension is knocked off One skilled in the art will recognize that the above rules are merely exemplary, and that any set of static and/or dynamic rules can be applied.

Multifaceted Navigation Model 205

The result of application of the computational model is a multifaceted navigation model. This model presents a set of charts, or visualizations, that users can view and explore via any suitable navigation mechanism. In at least one embodiment, the navigation model is represented as a virtual 3D object. Any number of such visualizations can be made available. In at least one embodiment, they are organized as surfaces on a virtual cube; the user can navigate among the surfaces in a horizontal and/or vertical direction. The virtual cube metaphor need not actually model a physical cube containing six surfaces (in which, after four rotations in any given direction, one would normally return to the starting point); rather, any number of new surfaces can be presented in response to repeated rotation in a particular direction. In this manner, the system is able to present any suitable number of visualizations of a particular type or level, and is not limited to the four that would be presented if modeling an actual physical cube.

The following details concerning the navigational model represented as a 3D object are intended to be exemplary. One skilled in the art will recognize that the results of the computational model described above can be presented using any suitable technique, including visual, nonvisual, auditory, haptic, spoken word, text-based, graphical, interactive, and/or non-interactive techniques. Conversely, one skilled in the art will recognize that the navigational model described herein can be used for presentation of any type of quantitative or non-quantitative data, and is not limited to presentation of results of a computational model as described above.

Furthermore, one skilled in the art will recognize that the navigational model described herein can be applied to any type of quantitative and/or non-quantitative data that is capable of being represented visually. Thus, the navigational model is not limited to application to hierarchical data derived according to the techniques described above. More particularly, the described navigational model is orthogonal to the metadata generation mechanism described above, and can be implemented in combination with, or separately from, such metadata generation methods.

The navigational model can be presented on any suitable platform, such as computing device 101, client device 108, or the like. Such device 101 or 108 can be, for example, a mobile device, tablet, smartphone, laptop, desktop computer, kiosk, and/or the like. Output and interactions can take place via communications network 113 such as the Internet, for example if data visualizations and interactions are made available on a cloud-based computing service.

Figure 8:
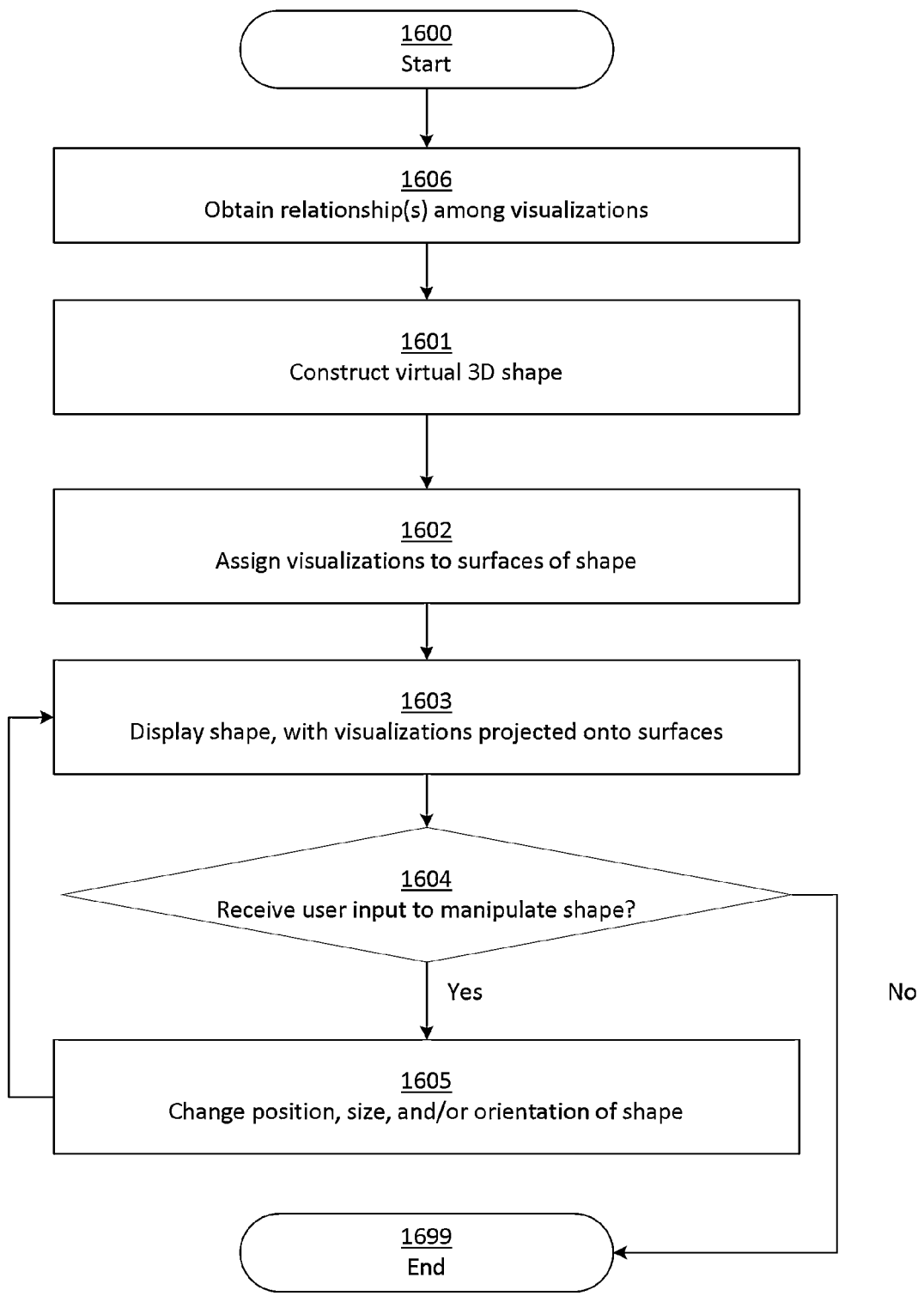
FIG. 8 is a flow diagram depicting an example of an algorithm for navigating among visualizations of quantitative data, according to one embodiment.

Referring now to FIG. 8, there is shown a flow diagram depicting an example of an algorithm for navigating among visualizations of quantitative data, according to one embodiment. First, relationship(s) among visualizations are obtained or determined 1606; this step can be performed, for example, using the techniques described above and/or by any other suitable techniques. A virtual 3D shape is then constructed 1601, such as for example a cube or cuboid, although any suitable shape can be used, and visualizations are assigned 1602 to surfaces of the shape. In at least one embodiment, relationships between surfaces of the 3D shape are representative of various types of relationships among the corresponding visualizations. For example, if two visualizations are hierarchically related to one another, they may be assigned to surfaces that are vertically adjacent to one another; conversely, visualizations that are related to one another on a peer-level basis may be assigned to surfaces that are horizontally adjacent to one another. Other arrangements are possible, including using nested shapes to signify hierarchical relationships.

The shape is then displayed 1603, for example on display screen 103 of device 101 or client device 103. Visualizations are projected onto the visible surfaces of the shape, for example using texture mapping techniques or other suitable techniques. In at least one embodiment, user 100 can interact with the displayed shape, for example using input device 102. Such interaction can include direct manipulation (such as by dragging a finger on a touch-sensitive screen, or moving an on-screen cursor via a mouse or trackpad), or keyboard manipulation, or text manipulation, or the like. In at least one embodiment, device 101 or 103 may be equipped with an accelerometer, so that the interaction can include tilting or shaking device 101 or 103. As one example, user 100 might drag horizontally to rotate the shape in a horizontal direction, or vertically to rotate it vertically, or tap to zoom in, or double-tap to zoom out. Such interactions are merely examples.

In response to such user input to manipulate the shape 1604, the position, size, and/or orientation of the shape is changed 1605. Such changes can include, for example, causing the shape to zoom in or out, or to rotate, or to move. Such changes may cause different surfaces (with their corresponding visualizations) to come into view, while previously displayed surfaces (and visualizations) may disappear from view. Such changes may also cause the manner in which visualizations are displayed to change; for example, some may become smaller or larger, or may be seen from a different angle, because of the changes made to position, size, and/or orientation of the shape. The display is updated accordingly, and the method returns to step 1603. In at least one embodiment, the display is updated dynamically, as user 100 performs the input operation; thus, user 100 can see instant feedback from the input operation. This reinforces the three-dimensional nature of the display, and encourages interactivity.

In at least one embodiment, user 100 can perform any number of interactions to provide input to manipulate the displayed shape, so that steps 1603, 1604, and 1605 can be repeated any number of times. Once user 100 is finished interacting with the displayed shape, or dismissed the app or screen, the method ends 1699.

Figure 10:
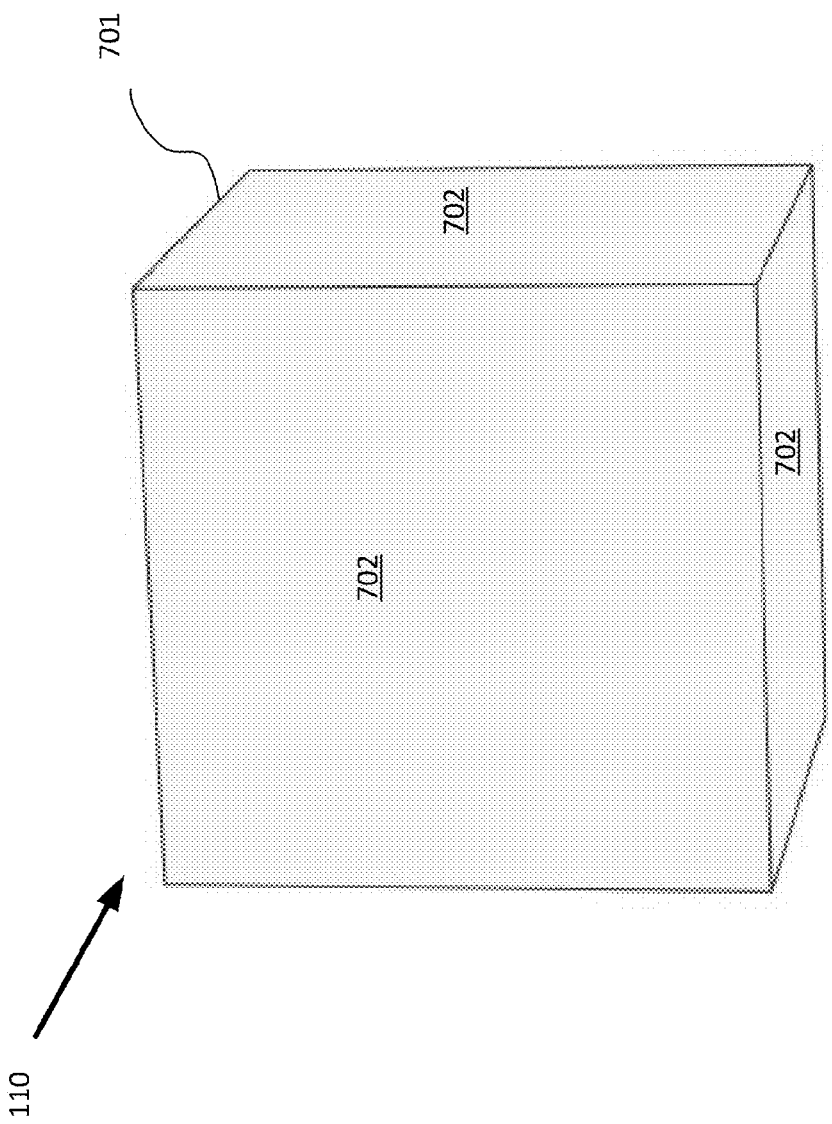
FIG. 10 is an example of a cube that can be displayed on a screen for user interaction, according to one embodiment.

Referring now to FIG. 10, there is shown an example of a cube 701 (referred to as a "ChartCube") that can be displayed on a screen 103 for user interaction. Cube 701 can be displayed, for example as part of user interface 110 for presenting information to user 100 and for allowing user 100 to navigate within and interact with such information. For example, as described in more detail below, user 100 can interact with cube 701 in various ways to see different levels of data, based on the hierarchy developed in connection with the computational model described above.

In at least one embodiment, each surface 702 of cube 701 represents a view of data that user 100 can select by navigating to that surface 702. User 100 can manipulate cube 701 to expose different surfaces 702 using any suitable input mechanism; for example, user 100 can perform a gesture such as swiping up, down, left, or right, to cause cube 701 to rotate in the indicated direction. Such gesture can be input, for example, via a touch-sensitive screen, or by moving a mouse or other pointing device, or by keyboard, joystick, or button controls, or by speech control, or accelerometer, or the like. Alternatively, in some embodiments, cube 701 may rotate automatically, for example after some predetermined period of time or upon detection of a trigger event.

Figure 12:
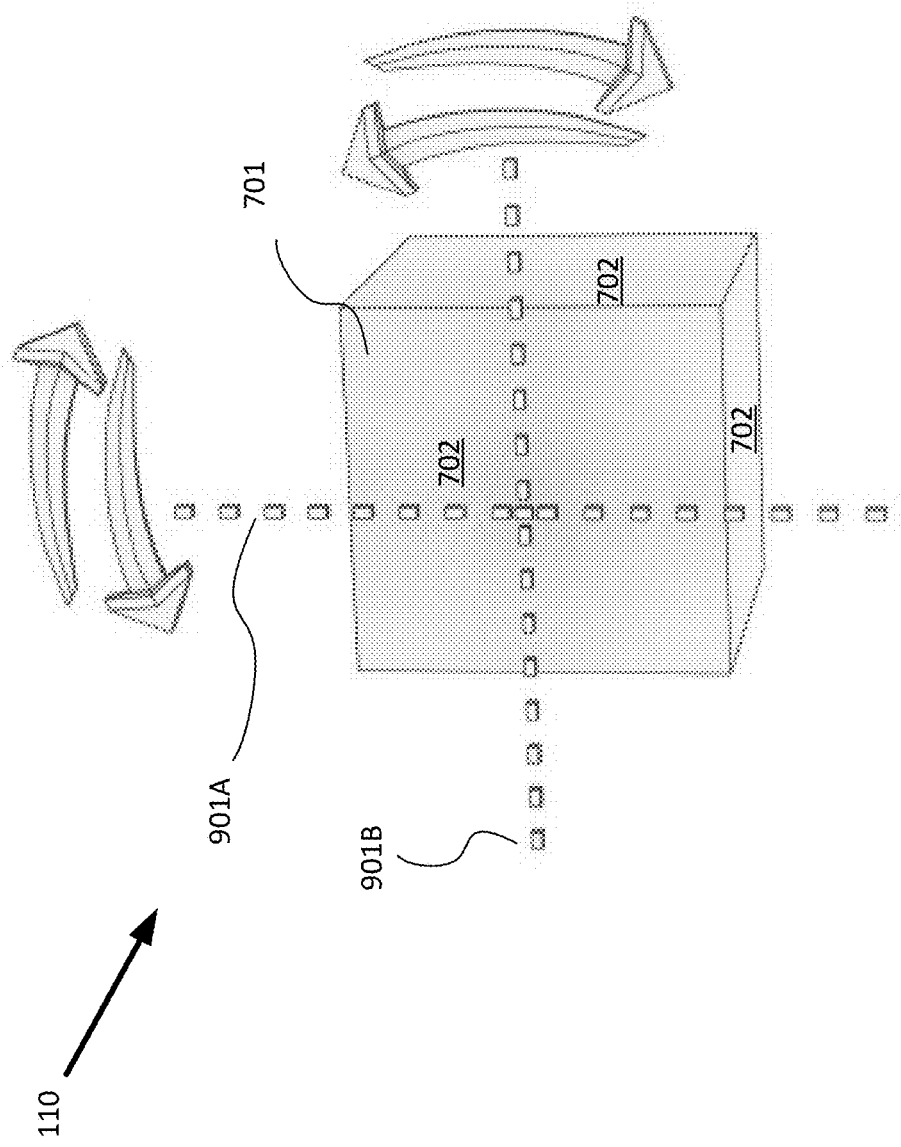
FIG. 12 is an example of navigation from one surface of a cube to another, according to one embodiment.

Referring now to FIG. 12, there is shown an example of navigation from one surface 702 of a cube 701 to another. As described above, one of the dimensions changes when cube 701 is rotated horizontally (about axis 901A), and another dimension changes when cube 701 is rotated vertically (about axis 901B). For example, in at least one embodiment, horizontal rotation about axis 901A causes cube 701 to display a new surface 702 containing a new visualization having different metrics but the same dimension as the originally displayed visualization. Vertical rotation about axis 901B causes cube 701 to display a new surface 702 containing a new visualization having the same metrics but a different dimension. Other arrangements are possible.

Figure 14:
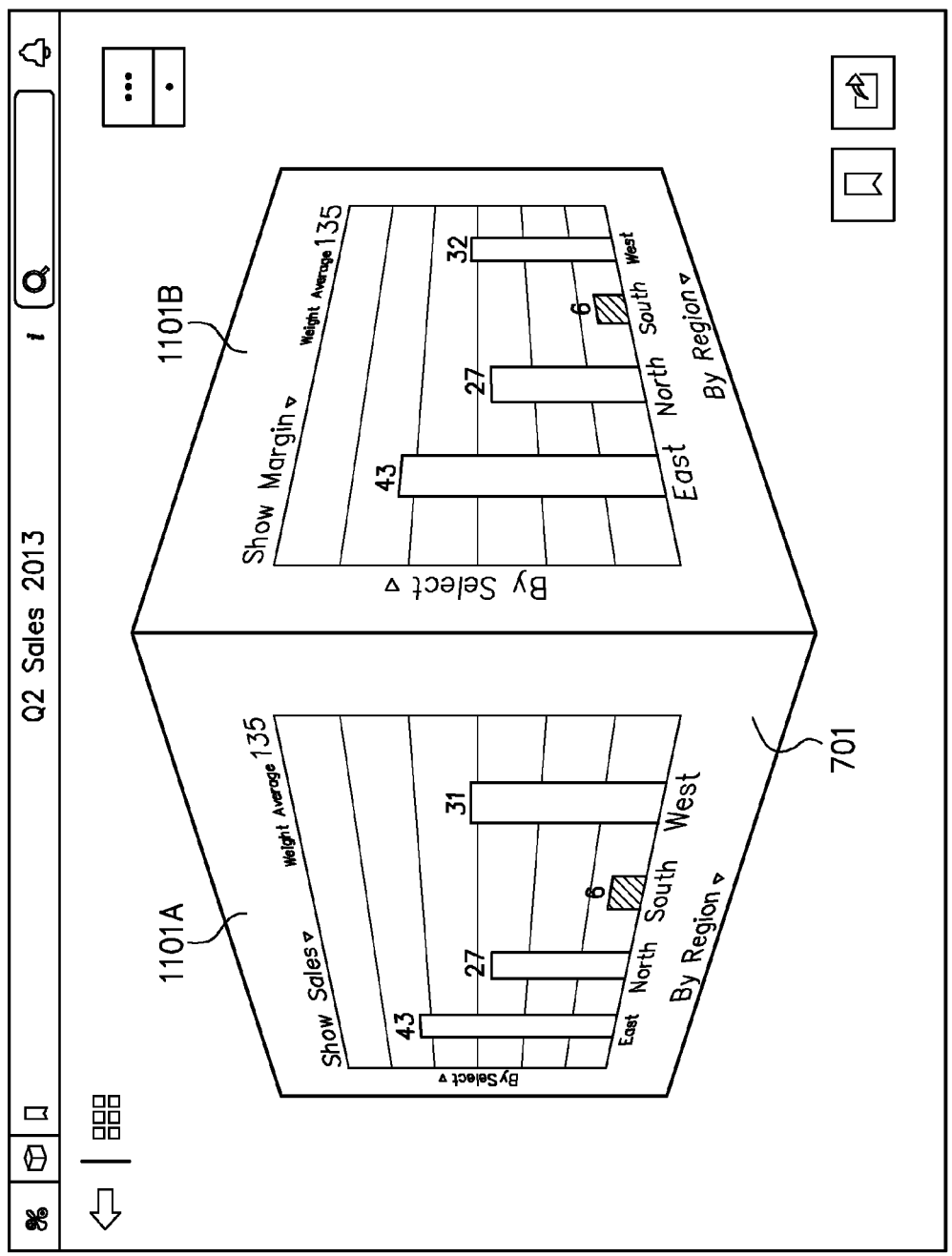
FIG. 14 is a screen shot depicting an example of a navigation operation involving horizontal rotation of a cube, according to one embodiment.

In at least one embodiment, for example, when a visualization is displayed, a "next metric" user action (for example, by swiping horizontally on a touch-sensitive screen), causes a displayed cube 701 to rotate horizontally to display a new surface 702 containing a new visualization. In at least one embodiment, this new visualization may have different metrics but the same dimension as the originally displayed visualization. Referring now to FIG. 14, there is shown a screen shot depicting an example of such a navigation operation. Visualization 1101A depicts a bar graph of sales by various regions; horizontal navigation causes cube 701 to rotate to reveal visualization 1101B, which shows different metrics (margins instead of sales), but for the same regions.

Figure 15:
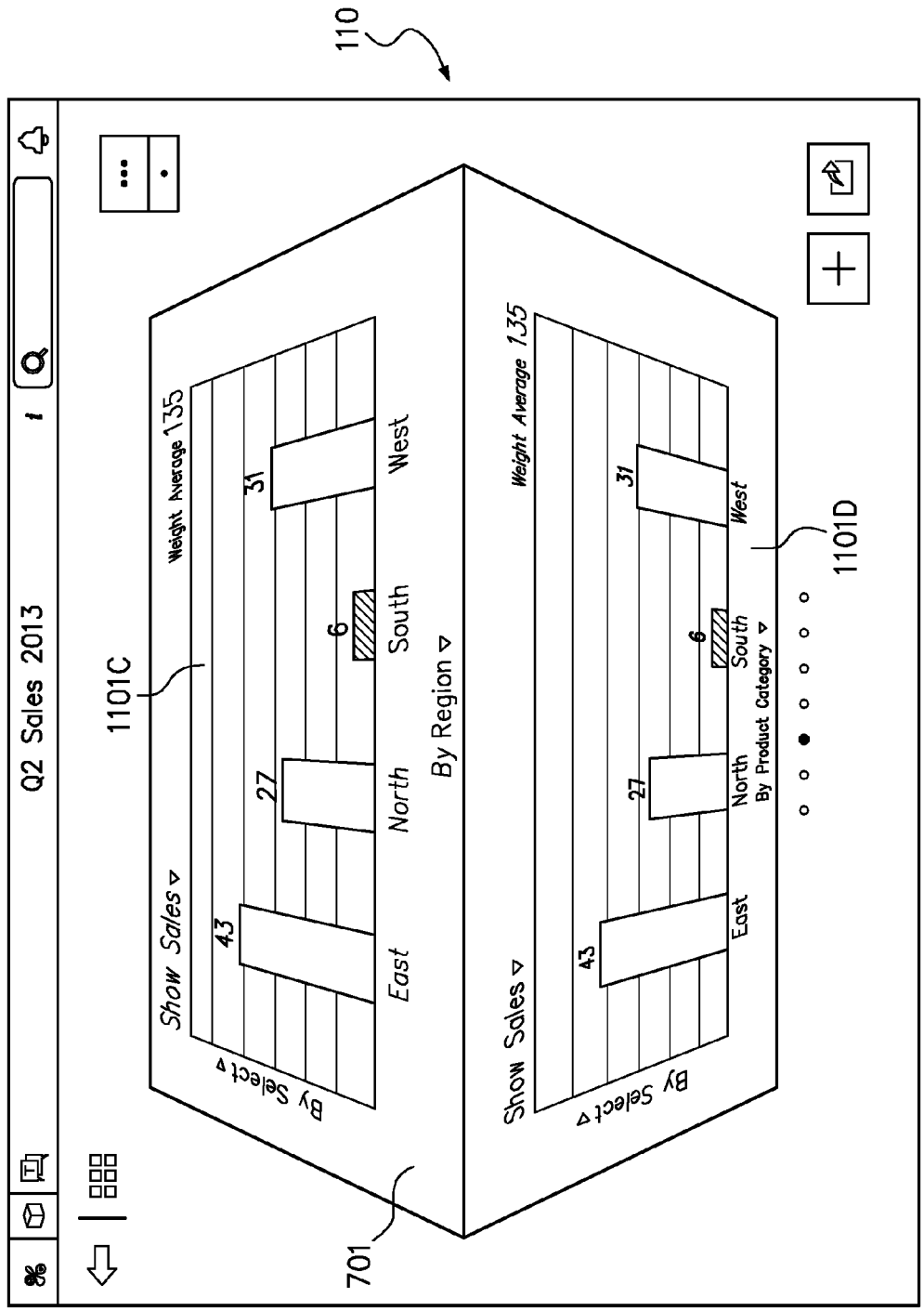
FIG. 15 is a screen shot depicting an example of a navigation operation involving vertical rotation of a cube, according to one embodiment.

In at least one embodiment, a "next dimension" user action (for example by swiping vertically on a touch-sensitive screen), causes a displayed cube 701 to rotate vertically to display a new surface 702 containing another new visualization, this time having the same metric but a different dimension. Referring now to FIG. 15, there is shown a screen shot depicting an example of such a navigation operation. Visualization 1101C depicts a bar graph of sales by various regions; vertical navigation causes cube 701 to rotate to reveal visualization 1101D, which shows different dimensions (product categories instead of regions), but for the same metric (sales). By reviewing data in this manner, user 100 is able to explore data from a flat file in a dynamic manner; the system thus allows user 100 to more effectively visualize and determine how his or her business or product is doing across various categories and/or regions.

In at least one embodiment, a user can tap on a section or element of a displayed visualization 1101 (e.g., a bar in a bar chart) to zoom in ("drill down") on cube 701 to view a level containing more detail on that section or element. Another command can cause zooming out ("drilling up"). In at least one embodiment, at any level, the "next/previous metric", "next/previous dimension" and "drill down/up" paradigms hold, so as to make it very easy for people to explore data on devices such as smartphones and tablets.

One example of an application of the cube rotation technique is to provide a mechanism for navigating among various charts or views of a spreadsheet file (or set of files) along various axes. Rotating in a horizontal direction can be used to navigate different dimensions (or categories) of the spreadsheet. Rotating in a vertical direction can be used to navigate the metrics (or values) of the spreadsheet. In addition, tapping or clicking on a surface 702 of a cube 701 can be used to initiate a drill-down operation to navigate among hierarchical views as may be defined according to the computational model described above.

Figure 11:
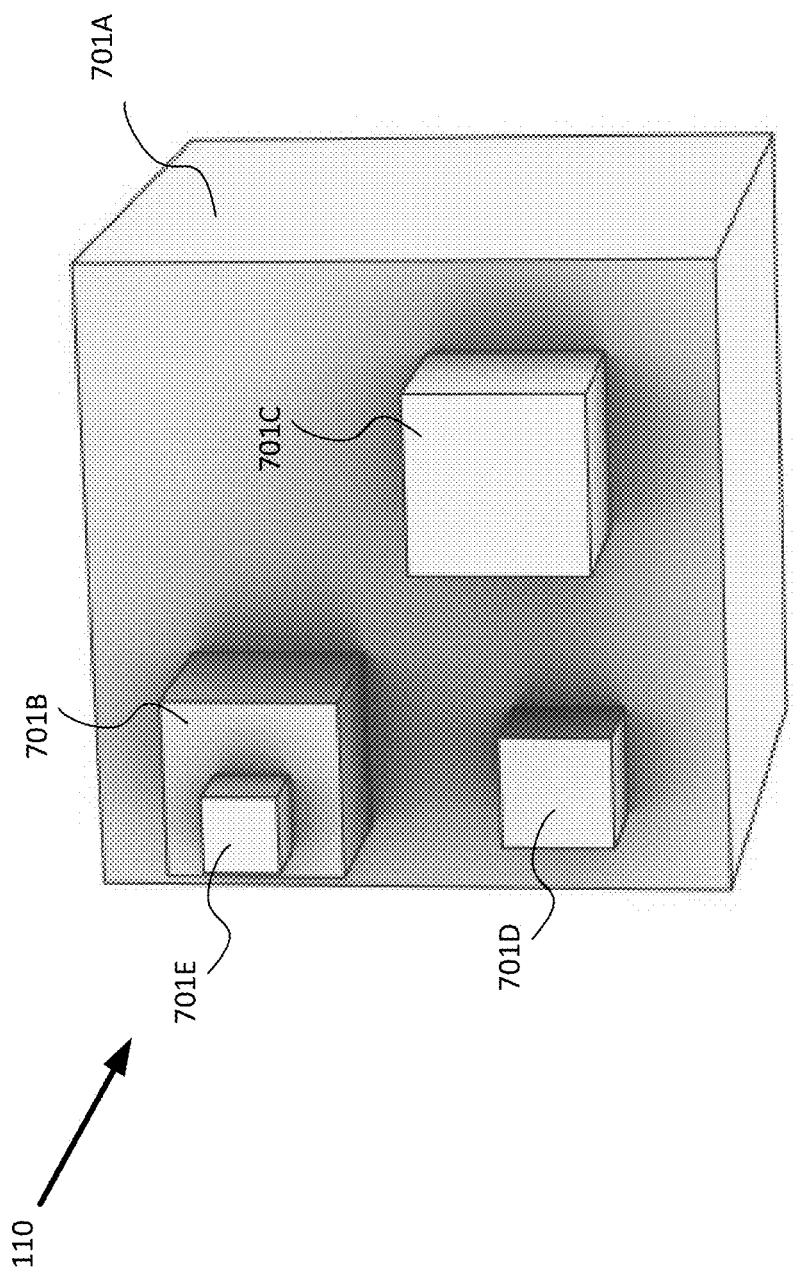
FIG. 11 is an example of cube nesting according to one embodiment.

In at least one embodiment, such drill-down operations can be reinforced by the use of nesting cubes 701. Referring now to FIG. 11, there is shown an example of cube nesting according to one embodiment. In the example, cube 701E is nested within cube 701B. Cubes 701B, 701C, and 701D are nested within cube 701A. The visual depiction of a nesting relationship emphasizes the hierarchical relationship among the underlying data. Any number of cubes 701 can be nested in one another.

Figure 16:
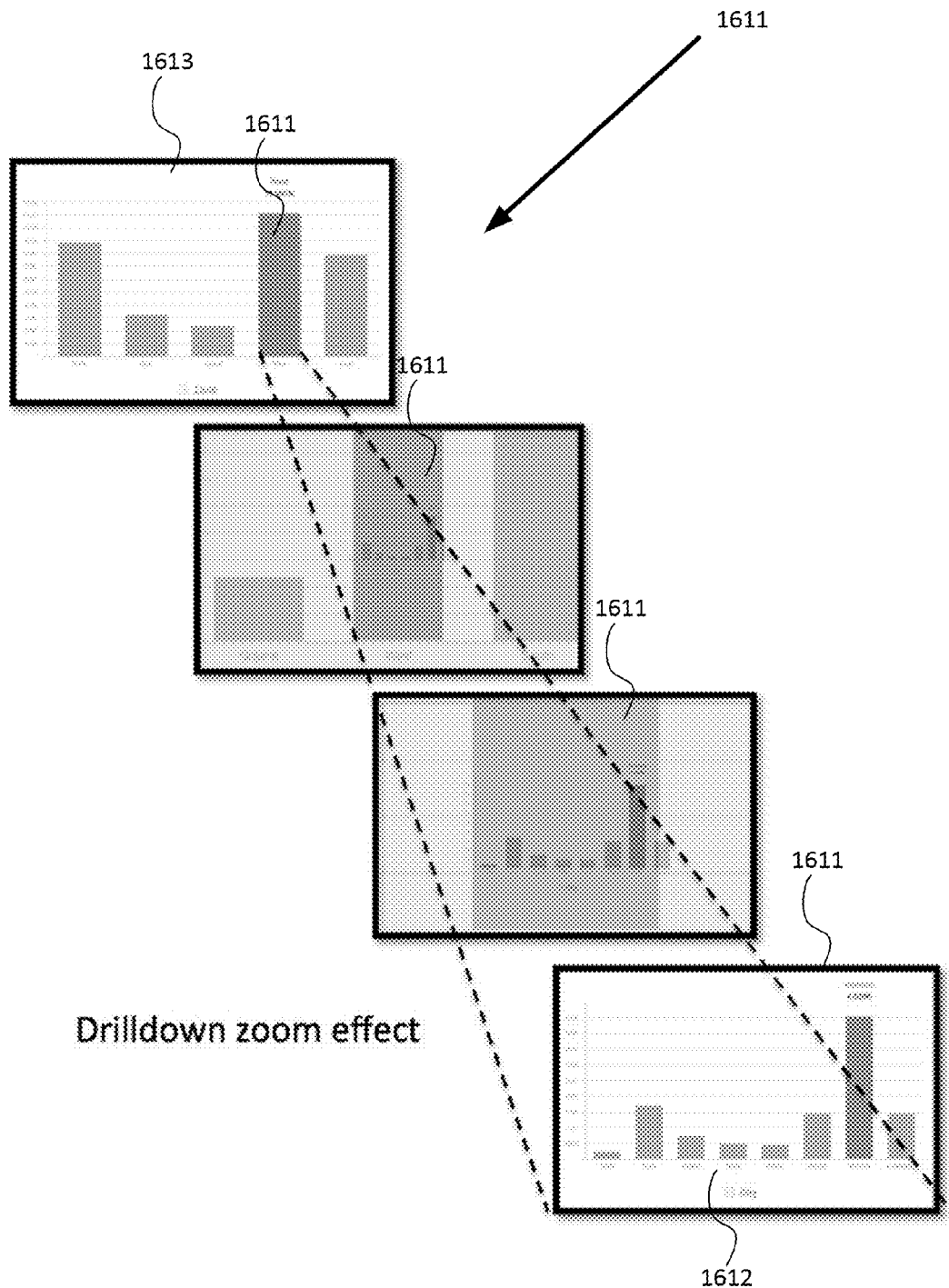
FIG. 16 depicts an example of a drill-down zoom effect, according to one embodiment.

Referring now to FIG. 16, there is shown an example 1611 of a drill-down zoom effect, according to one embodiment. Initial graphic 1613 is a bar graph containing a number of elements, one of which is a bar 1611. In response to a user command, the display zooms in on bar 1611, as shown by successive frames in example 1611. In each frame, the original bar graph expands, until only bar 1611 is visible. Components of bar 1611 are introduced, in this case as a sub-bar graph 1612, although in other embodiments, the zoomed-in view can take any suitable form. The transition among the frames of example 1611 can be displayed as a continuous zoom effect, making it appear as though the user is moving inside the initial graph 1613.

Any suitable gesture can be used for triggering the drill-down zoom effect, for example by tapping on an element of initial graphic 1613, or performing a pinch gesture or the like. The user can reverse the process, to trigger a drill-up effect, for example by performing a reverse pinch, or swiping, or tapping on a "back" button, or the like. In response to such action, the zoom effect is reversed, to display a drill-up zoom and thereby restore the original appearance as shown in frame 1613. Other techniques are possible.

Based on the nesting relationships among cubes 701, user 100 can zoom into or out of cubes 701 to see other levels of data. This can include zooming in for more detail on a particular element, or zooming out to see more context. Zooming in to another cube 701 inside a cube 701 (such as, for example, cube 701C within cube 701A) can reveal more details concerning a subset of the data in the parent cube 701.

Nested cubes 701 therefore provide a paradigm that facilitates navigation along hierarchical as well as non-hierarchical (peer-level) relationships. For example, if user 100 is presented with a chart having bars for each sales region (east, west, north, south), performing an action (such as tapping, double-clicking, or the like) on the south region will drill down and display the chart for all cities in the south. The selection of data displayed is changed accordingly. In general, nesting thus allows users 100 to navigate from a more general view (such as by region) to a more specific view (such as by city within a region). Many other hierarchical relationships can be represented in this manner.

Figure 13:
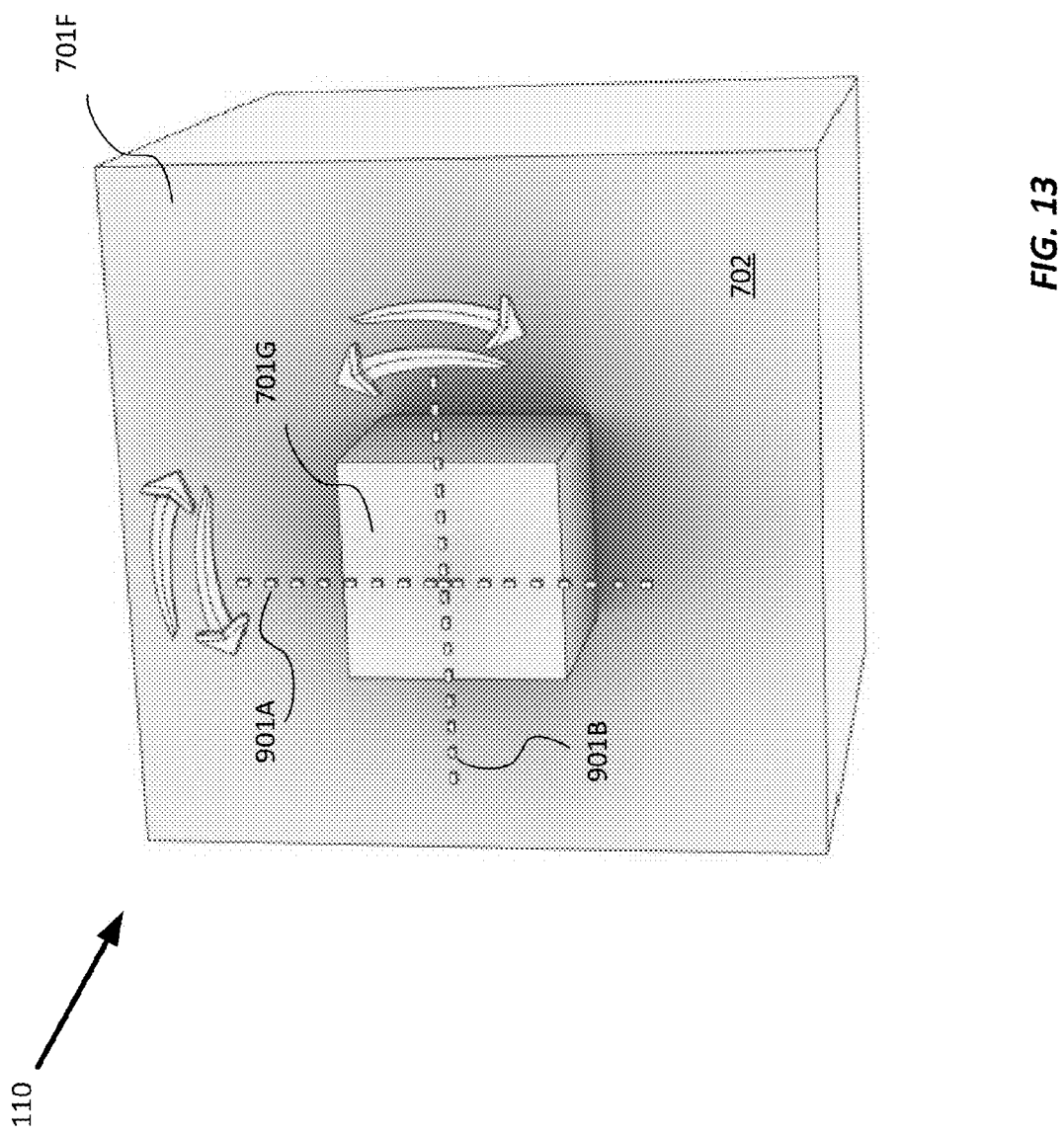
FIG. 13 is an example of drill-down followed by cube rotation, according to one embodiment.

Referring now to FIG. 13, there is shown an example of drill-down followed by cube rotation. Here, user 100 chooses an element on a surface 702 of cube 701F, and drills down (by tapping, double-clicking or the like) into a smaller cube 701G that represents detailed data for that element. User 100 can then rotate the smaller cube 701G along axes 901A and/or 901B, in the same manner as described above, to see different metrics and/or dimensions and thereby navigate via peer-level relationships.

One skilled in the art will recognize that the above-described mappings between user interactions with the interface and navigation to different aspects, views, and elements are merely exemplary. In other embodiments, other mappings can be used; for example, horizontal swiping, vertical swiping, and zooming in/out can cause other types of transformations and navigations to take place. In addition, other forms of interaction with cubes 701 and/or other elements may take place, and such interactions can result in other types of navigation among visualizations. The examples described and depicted herein are intended to illustrate the invention in certain embodiments without limiting it to those embodiments.

The navigational and representational techniques described herein can be applied to any type of data for presentation to a user 100, and are not limited to spreadsheets or other quantitative data. For example, the cube-based navigational model can be used for presentation of news events, videos, books, articles, file system navigation, media navigation, and/or the like. In the example of news events horizontal rotation can be used to navigate among topics, while vertical rotation can be used to navigate within a timeline of events; tapping can be used to drill down into more specific articles on a topic. Many other arrangements can be used.

Other shapes besides cubes 701 can be used. Such shapes can be polygons, other three-dimensional shapes, shapes having two, four, or more dimensions, or the like. In addition, any suitable combination of shapes can be used. In other examples, cube 701 may be replaced by a multi level carousel, a sphere, or any other suitable shape that permits movement along two axes (such as left/right and up/down), plus a drill-down direction. Accordingly, one skilled in the art will recognize that the depictions herein, which focus on cube-shaped elements, are merely exemplary.

In at least one embodiment, transitions from one view to another are accompanied by appropriate animations to reinforce the physical relationships of the cube metaphor. For example, the cube 701 can be made to rotate, grow, or shrink as appropriate. Texture mapping can be used to project visualizations on cube surfaces while the animation is taking place, so as to further reinforce the impression that a physical cube is being manipulated.

In at least one embodiment, navigation among surfaces 702 of a cube 701 and/or from one cube 701 to another can be automatic, for example following a predetermined sequence. This can be used to implement a "demonstration mode", "easy mode", or similar interaction mode. In at least one embodiment, a user can freely interact with a displayed cube 701 even while automatic navigation is taking place.

Alternative Interaction Schemes

One skilled in the art will recognize that the navigational model can be implemented using many different interaction schemes, and are not limited to the rotatable cube implementation described above. The following are additional examples of interaction schemes that can be used for implementing the present invention. The examples set forth herein are intended to be illustrative and not exhaustive.

Carousel

Figure 17:
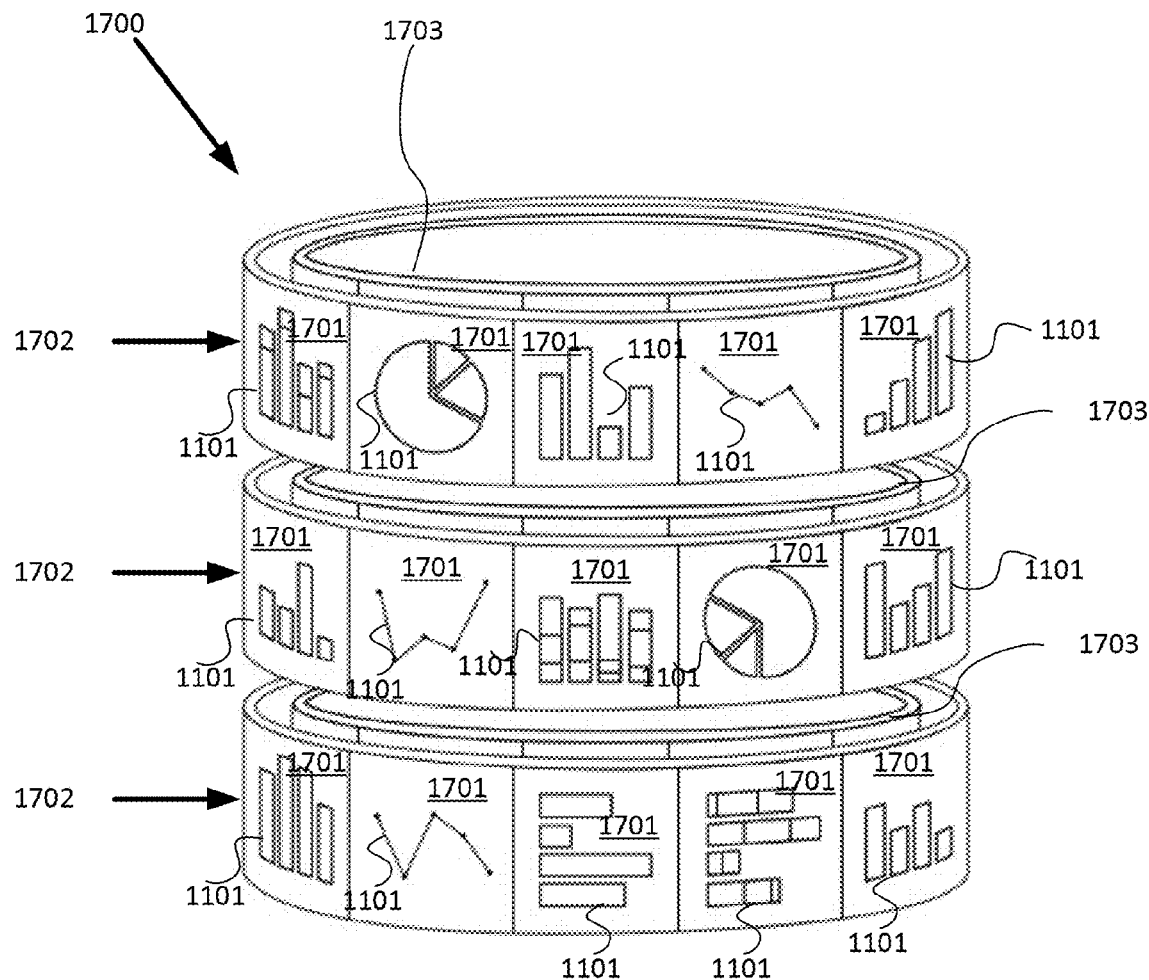
FIG. 17 depicts an example of a carousel embodiment for multifaceted navigation, according to one embodiment.

Referring now to FIG. 17, there is shown an example of a carousel embodiment 1700 for multi-faceted navigation, according to one embodiment. Carousel 1700 can be displayed on display screen 103, and user can interact with displayed carousel 1700 using any suitable input device 102. Any number of carousel rings 1702 can be provided. In the depicted embodiment, rings 1702 are oriented horizontally, so that they can rotate about a vertical axis. In another embodiment, rings 1702 can be oriented vertically (rotating about a horizontal axis) or diagonally. If multiple carousel rings 1702 are provided, they can be stacked so that they rotate about a common axis. For example, horizontally oriented rings 1702 can be vertically stacked, whereas vertically oriented rings (not shown) can be horizontally stacked. In at least one embodiment, multiple concentric rings can nested within one another; for example, as shown in FIG. 17, inner rings 1703 are nested within rings 1702. Any number of such concentric rings can be provided.

In at least one embodiment, rings 1702 are divided into a plurality of surfaces 1701, each containing a visualization 1101. A user can select, view, and/or interact with a particular visualization 1101 by rotating a ring 1702 until the desired visualization 1101 is in the desired location, such as the center position in the current view. In at least one embodiment, rings 1702 can be rotated by direct manipulation, such as by swiping with a finger. Other mechanisms can be used for manipulating rings 1702, including for example controlling an on-screen pointer or cursor with a pointing device such as a mouse or trackpad, or keyboard commands, or the like.

In at least one embodiment, the user can navigate in different ways to see different visualizations 1101 that have distinct relationships with one another. In at least one embodiment, surfaces 1701 within a ring 1702 contain visualizations 1101 that have different metrics for the same dimension. Surfaces 1701 on different rings 1702 that are stacked on one another contain visualizations 1101 that have different dimensions but the same metric. Surfaces 1701 on rings 1703 nested within other rings 1702 allow for drill-down.

For example, in at least one embodiment, a user can navigate as follows (in an implementation having horizontally oriented rings 1702, as shown in FIG. 17):

To navigate from one metric to another metric (keeping same dimension):

The user chooses a particular ring 1702 to manipulate.

The user swipes horizontally to the right to bring into front view a surface 1701 containing a visualization 1101 for the next metric, but same dimension.

The user swipes horizontally to the left to bring into front view a surface 1701 containing a visualization 1101 for the previous metric, but same dimension.

To navigate from one dimension to another dimension (keeping same metric):

The user chooses a particular ring 1702 to manipulate.

The user swipes vertically from top to bottom to switch to a different ring and thereby bring into front view a surface 1701 containing a visualization 1101 for the next dimension, but same metric.

The user swipes vertically from bottom to top to switch to a different ring and thereby bring into front view a surface 1701 containing a visualization 1101 for the previous dimension, but same metric.

To drill down:

The user chooses a particular ring 1702 to manipulate.

The user double-taps on a selected surface 1701 containing a visualization 1101 to initiate drill-down.

The outer ring 1702 disappears and the inner ring 1703 is revealed to display the lower-level visualization(s) 1101. In at least one embodiment, inner ring 1703 contains any number of visualizations 1101 containing more detail than corresponding visualization(s) 1101 on ring 1701.

In at least one embodiment, the user can navigate within inner ring 1703 in the same manner as described above for outer ring 1702. The user can navigate to different metrics (using horizontal swipes) or to different dimensions (using vertical swipes); the drill-down filter is maintained during such operations.

The above-described steps can be repeated any number of times to drill down to successively nested rings. A different gesture can be used for drill-up, or backing out of inner rings into successive outer rings.

Tesseract

Figure 18:
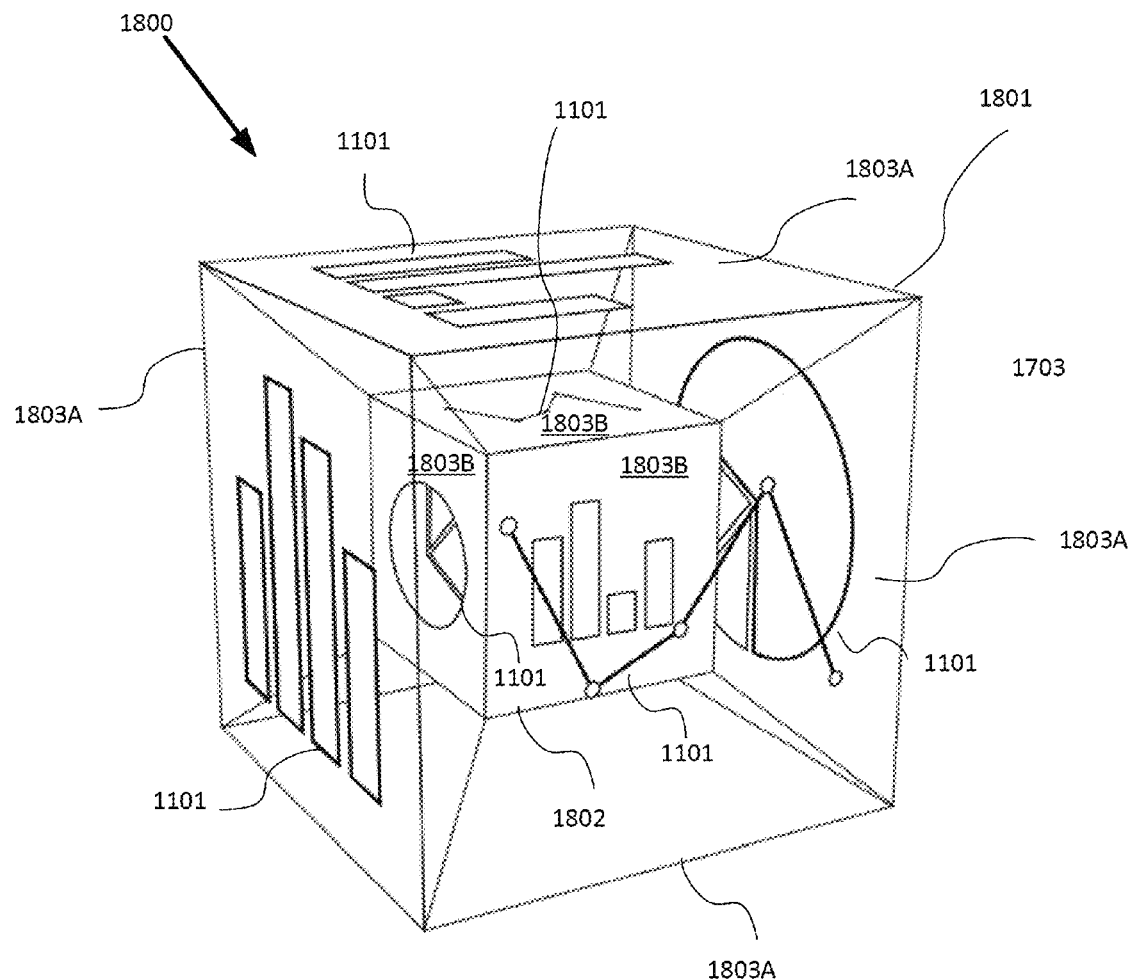
FIG. 18 depicts an example of a tesseract embodiment for multifaceted navigation, according to one embodiment.

Referring now to FIG. 18, there is shown an example of a tesseract embodiment 1800 for multi-faceted navigation, according to one embodiment. Tesseract 1800 can be displayed on display screen 103, and user can interact with displayed tesseract 1800 using any suitable input device 102. Tesseract 1800 can include any number of nested cubes; for illustrative purposes, two nested cubes 1801, 1802 are shown in FIG. 18. In at least one embodiment, each cube 1801, 1802 has six surfaces 1803; in the example of FIG. 18, surfaces of outer cube 1801 are labeled as 1803A, and surfaces of inner cube 1801 are labeled as 1803B. Each surface 1803 can include a visualization 1101. In at least one embodiment, outer cube 1801 may be transparent or translucent so as to allow inner cube 1802 to be visible. In at least one embodiment, outer cube 1801 may not initially be transparent or translucent (so as to permit improved viewing of visualizations 1101 projected on surfaces 1803A of outer cube 1801), but a control can be provided to allow the user to cause outer cube 1801 to be transparent or translucent, either persistently or transiently.

Cubes 1801, 1802 are rotatable along any suitable axis. For example, in one embodiment, the user can rotate cubes 1801, 1802 vertically or horizontally, so as to expose surfaces 1803 (and visualizations 1101) that may not initially be visible. In at least one embodiment, cubes 1801, 1802 rotate in concert with one another; in another embodiment, they rotate separately from one another.

In at least one embodiment, cubes 1801, 1802 can be configured so that rotating them causes a succession of surfaces 1803 to be exposed. As described above in connection with the virtual cube metaphor, tesseract embodiment 1800 need not actually model a set of physical cubes containing six surfaces (in which, after four rotations in any given direction, one would normally return to the starting point); rather, each cube-like shape 1801, 1802 can contain any number of new surfaces 1803 which can successively be presented in response to repeated rotation in a particular direction. In this manner, the system is able to present any suitable number of visualizations of a particular type or level, and is not limited to the four that would be presented if modeling actual physical nested cubes.

As described above, surfaces 1803 can contain visualizations 1101. A user can select, view, and/or interact with a particular visualization 1101 by rotating cubes 1801, 1802 until the desired visualization 1101 is in the desired location, such as the center position in the current view. In at least one embodiment, cubes 1801, 1802 can be rotated by direct manipulation, such as by swiping with a finger. Other mechanisms can be used for manipulating cubes 1801, 1802, including for example controlling an on-screen pointer or cursor with a pointing device such as a mouse or trackpad, or keyboard commands, or the like.

In at least one embodiment, the user can navigate in different ways to see different visualizations 1101 that have distinct relationships with one another. In at least one embodiment, surfaces 1803 that are horizontally adjacent to one another contain visualizations 1101 that have different metrics for the same dimension. Surfaces 1803 that are vertically adjacent to one another contain visualizations 1101 that have different dimensions but the same metric. Surfaces 1803 on cubes nested within other cubes (such as cube 1802 nested within cube 1801) allow for drill-down.

For example, in at least one embodiment, a user can navigate as follows:

To navigate from one metric to another metric (keeping same dimension):
  The user chooses a particular cube 1801, 1802 to manipulate (in at least one embodiment, cubes 1801, 1802 can be manipulated in concert with one another).
  The user swipes horizontally to the right to bring into front view a surface 1803 containing a visualization 1101 for the next metric, but same dimension.
  The user swipes horizontally to the left to bring into front view a surface 1803 containing a visualization 1101 for the previous metric, but same dimension.

To navigate from one dimension to another dimension (keeping same metric):
  The user chooses a particular cube 1801, 1802 to manipulate (in at least one embodiment, cubes 1801, 1802 can be manipulated in concert with one another).
  The user swipes vertically from top to bottom to bring into front view a surface 1803 containing a visualization 1101 for the next dimension, but same metric.
  The user swipes vertically from bottom to top to bring into front view a surface 1803 containing a visualization 1101 for the previous dimension, but same metric.

To drill down:
  The user chooses a particular top level surface 1803A on outer cube 1801.
  The user double-taps on the selected surface 1803A to initiate drill-down.
  The outer cube 1801 disappears and the inner cube 1802 is revealed, to display the lower-level visualization(s) 1101.
  In at least one embodiment, the user can navigate within inner cube 1802 in the same manner as described above for outer cube 1801. The user can navigate to different metrics (using horizontal swipes) or to different dimensions (using vertical swipes); the drill-down filter is maintained during such operations.
  The above-described steps can be repeated any number of times to drill down to successively nested cubes of tesseract 1800. A different gesture can be used for drill-up, or backing out of inner cubes into successive outer cubes of tesseract 1800.

Multi-Layers

Figure 19:
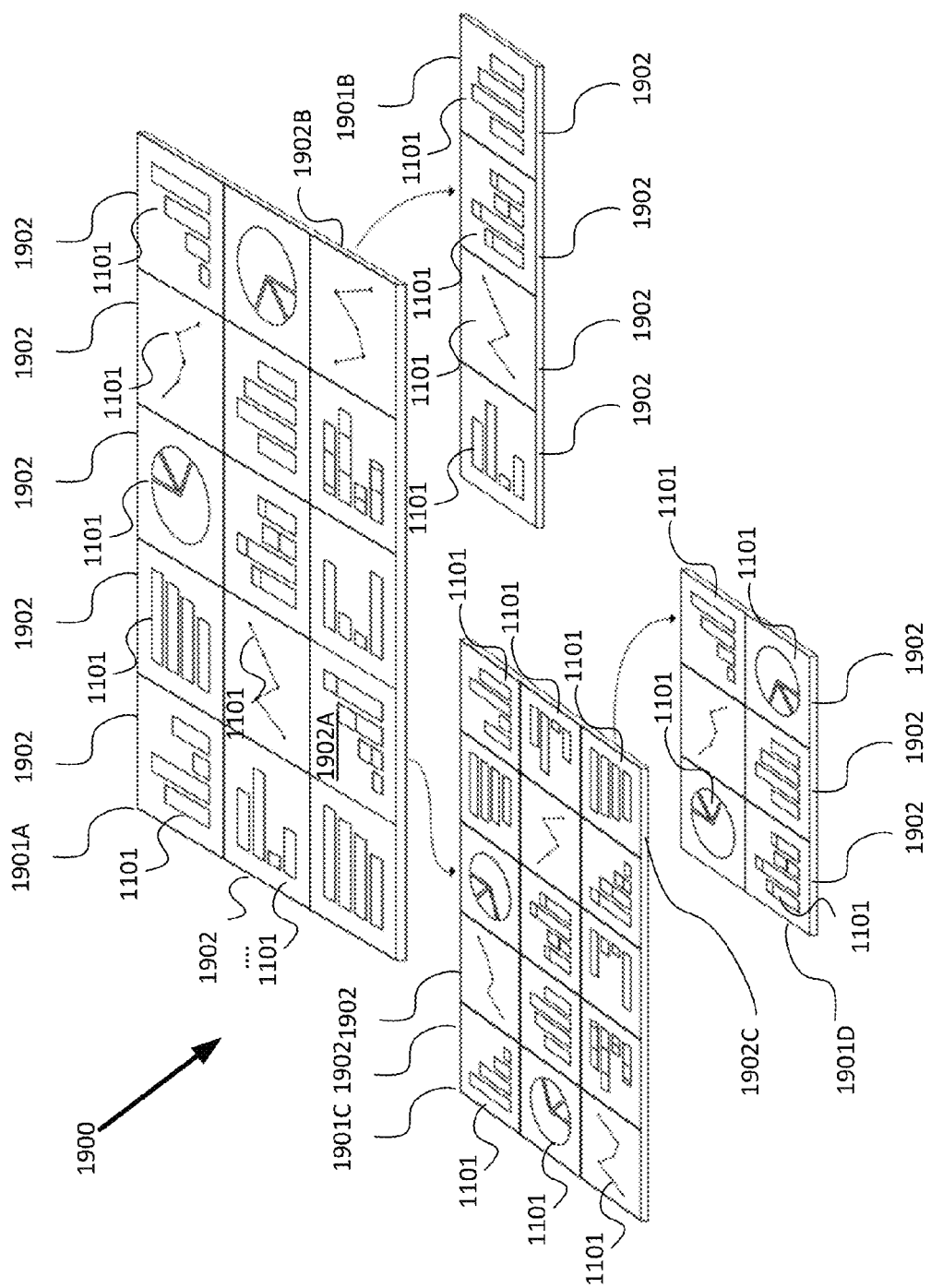
FIG. 19 depicts an example of a multi-layer embodiment for multifaceted navigation, according to one embodiment.

Referring now to FIG. 19, there is shown an example of a multi-layer embodiment 1900 for multi-faceted navigation, according to one embodiment. Multi-layer display 1900 can be shown on display screen 103, and user can interact with multi-layer display 1900 using any suitable input device 102. Multi-layer display 1900 can include any number of layer palettes 1901; in the example of FIG. 19, four layer palettes 1901A, 1901B, 1901C, 1901D are shown. In at least one embodiment, each layer palette 1901 can have any number of cells 1902, which correspond to surfaces. Each cell 1902 can include a visualization 1101.

For illustrative purposes, FIG. 19 is a conceptual perspective view 1900 that depicts the relationships among various layer palettes 1901. However, in at least one embodiment, layer palettes 1901 are displayed in a top view. Initially, top layer palette 1901A is displayed, which includes various visualizations 1101 that are organized according to dimensions and metrics. The user can navigate within top layer palette 1901A to see different views of the data, and/or can drill down within a particular cell (such as 1902A or 1902B) of top layer palette 1901A to display other layer palettes such as 1901B and 1901C. Drilling down within a particular cell 1902C of palette 1901B causes further drill-down and display of layer palette 1901D.

In at least one embodiment, a perspective view such as that shown in FIG. 19 can be displayed on display screen 103, allowing the user to see the conceptual relationships among various layer palettes 1901 in a single view.

In at least one embodiment, layer palettes 1901 are slidable along at least two axes, such as a vertical and horizontal axis, with respect to the plane of layer palette 1901. For example, in one embodiment, the user can slide palettes 1901 vertically or horizontally, so as to display or highlight cells 1902 (and visualizations 1101) that may not initially be visible or highlighted.

As described above, cells 1902 can contain visualizations 1101. A user can select, view, and/or interact with a particular visualization 1101 by sliding layer palettes 1901 until the desired visualization 1101 is in the desired location, such as the center position in the current view. In at least one embodiment, layer palettes 1901 can be moved around by direct manipulation, such as by swiping with a finger. Other mechanisms can be used for manipulating layer palettes 1901, including for example controlling an on-screen pointer or cursor with a pointing device such as a mouse or trackpad, or keyboard commands, or the like.

In at least one embodiment, the user can navigate in different ways to see different visualizations 1101 that have distinct relationships with one another. In at least one embodiment, cells 1902 that are horizontally adjacent to one another contain visualizations 1101 that have different metrics for the same dimension. Cells 1902 that are vertically adjacent to one another contain visualizations 1101 that have different dimensions but the same metric. Some cells 1902 can be double-tapped to provide drill-down access to other layer palettes 1901.

For example, in at least one embodiment, a user can navigate as follows:

To navigate from one metric to another metric (keeping same dimension):
- The user chooses a particular cell 1902 in topmost layer palette 1901A; this is the primary zoomed-in view.
- The user swipes horizontally to the right to bring into the zoomed-in view a cell 1902 containing a visualization 1101 for the next metric, but same dimension.
- The user swipes horizontally to the left to bring into the zoomed-in view a cell 1902 containing a visualization 1101 for the previous metric, but same dimension.

To navigate from one dimension to another dimension (keeping same metric):
- The user chooses a particular cell 1902 in topmost layer palette 1901A; this is the primary zoomed-in view.
- The user swipes vertically from top to bottom to bring into the zoomed-in view a cell 1902 containing a visualization 1101 for the next dimension, but same metric.
- The user swipes vertically from bottom to top to bring into the zoomed-in view a cell 1902 containing a visualization 1101 for the previous dimension, but same metric.

To drill down:
- The user chooses a particular cell 1902 in topmost layer palette 1901A, such as cell 1902A or 1902B. In at least one embodiment, certain cells 1902 may be highlighted or otherwise visually distinguished to indicate that drill-down is available for those cells 1902.
- The user double-taps on the selected cell 1902 to initiate drill-down.
- The topmost layer palette 1901A disappears and the appropriate lower level layer palette 1901B or 1901C is revealed, to display the lower-level visualization(s) 1101.
- In at least one embodiment, the user can navigate within lower level layer palette 1901B or 1901C in the same manner as described above for topmost layer palette 1901A. The user can navigate to different metrics (using horizontal swipes) or to different dimensions (using vertical swipes); the drill-down filter is maintained during such operations.
- The above-described steps can be repeated any number of times to drill down to successive layer palettes 1901, such as layer palette 1901D which is accessible by double-tapping on cell 1902C of layer palette 1901C. A different gesture can be used for drill-up, or backing out of lower level layer palettes 1901 into successive higher level layer palettes 1901.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for generating metadata describing relationships among data sets comprising:
at a hardware processor, receiving quantitative data comprising a plurality of columns of data;
at the hardware processor, analyzing the quantitative data to determine hierarchical relationships among the columns of data based at least in part on at least one selected from the group consisting of:
previous actions by a particular user;
previous actions by other user's associated with the particular user; and
previous actions by all users; and
storing, at a storage device, metadata representing the determined hierarchical relationships;
wherein each column comprises a plurality of rows, and wherein analyzing the quantitative data to determine hierarchical relationships among the columns of data comprises, for at least one pair of columns:
establishing a mapping of a first column to a second column;
establishing a mapping of the second column to the first column;
determining the number of unique values in the first column;
determining the number of unique values in the second column;
for each unique value in the first column, determine a first set of different unique values in the second column;
for each unique value in the second column, determine a second set of different unique values in the first column; and
identifying relationships based on the determined first and second sets.

2. The method of claim 1, further comprising:
at the hardware processor, generating a set of visualizations from the metadata;
at the hardware processor, defining a navigational model based on the generated set of visualizations, wherein the navigational model provides a virtual spatial representation of the determined relationships among the columns of data; and
at an output device, presenting output for user interaction with the visualizations according to the navigational model.

3. The method of claim 2, wherein generating a set of visualizations from the metadata comprises generating the set of visualizations based at least in part on the determined relationships.

4. The method of claim 2, wherein the navigational model is based at least in part on the determined relationships.

5. The method of claim 2, further comprising:
at an input device, receiving user input to interact with the visualizations by manipulation of the virtual spatial representation; and
at the output device, responsive to the received user input, changing the displayed output according to the navigational model.

6. The method of claim 1, wherein analyzing the quantitative data to determine hierarchical relationships among the columns of data comprises determining hierarchical relationships based on learned behaviors.

7. The method of claim 1, wherein receiving quantitative data comprising a plurality of columns of data comprises receiving a flat file.

8. The method of claim 1, wherein receiving quantitative data comprising a plurality of columns of data comprises receiving output from a data service.

9. The method of claim 1, further comprising:
at the hardware processor, generating a set of visualizations from the metadata;

at the hardware processor, defining a navigational model based on the generated set of visualizations; and at an output device, presenting output for user interaction with the visualizations according to the navigational model.

10. The method of claim 1, wherein analyzing the quantitative data to determine relationships among the columns of data comprises applying machine learning.

11. The method of claim 10, wherein applying machine learning comprises determining at least one relationship based on previous actions by a user.

12. The method of claim 1, wherein identifying relationships based on the determined first and second sets comprises:

determining a first maximum size of the first set among all rows;

determining a second maximum size of the second set among all rows;

responsive to the first and second maximum sizes both being equal to zero, determining that there is no relationship between the pair of columns;

responsive to the first and second maximum sizes both being greater than 1, determining that there is no relationship between the pair of columns;

responsive to the first and second maximum sizes both being equal to 1, determining that there is a one-to-one relationship between the pair of columns;

responsive to one of the maximum sizes being equal to 1 and the other maximum size being greater than one, determining that there is a one-to-many relationship between the pair of columns.

13. The method of claim 1, further comprising constructing a hierarchy tree to represent the determined hierarchical relationships.

14. A computer program product for generating metadata describing relationships among data sets comprising:

a non-transitory computer-readable storage medium; and computer program code, encoded on the medium, configured to cause at least one hardware processor to perform the steps of:

receiving quantitative data comprising a plurality of columns of data;

analyzing the quantitative data to determine hierarchical relationships among the columns of data based at least in part on at least one selected from the group consisting of:

previous actions by a particular user;

previous actions by other user's associated with the particular user; and previous actions by all users; and causing a storage device to store metadata representing the determined hierarchical relationships;

wherein each column comprises a plurality of rows, and wherein the computer program code configured to cause at least one hardware processor to analyze the quantitative data to determine hierarchical relationships among the columns of data comprises computer program code configured to cause at least one hardware processor to perform the steps of, for at least one pair of columns:

establishing a mapping of a first column to a second column;

establishing a mapping of the second column to the first column;

determining the number of unique values in the first column;

determining the number of unique values in the second column;

for each unique value in the first column, determine a first set of different unique values in the second column;

for each unique value in the second column, determine a second set of different unique values in the first column; and identifying relationships based on the determined first and second sets.

15. The computer program product of claim 14, wherein the computer program code is configured to cause the at least one hardware processor to analyze the quantitative data to determine hierarchical relationships among the columns of data by applying machine learning.

16. The computer program product of claim 15, wherein the computer program code is configured to cause the at least one hardware processor to apply machine learning by determining at least one hierarchical relationship based at least in part on previous actions by a user.

17. The computer program product of claim 14, further comprising computer program code configured to cause at least one hardware processor to:

generate a set of visualizations from the metadata, based at least in part on the determined hierarchical relationships;

define a navigational model based on the generated set of visualizations, wherein the navigational model provides a virtual spatial representation of the determined relationships among the columns of data; and cause an output device to present output for user interaction with the visualizations according to the navigational model.

18. The computer program product of claim 14, further comprising computer program code configured to cause at least one hardware processor to:

generate a set of visualizations from the metadata;

define a navigational model based on the generated set of visualizations, wherein the navigational model provides a virtual spatial representation of the determined relationships among the columns of data and wherein the navigational model is based at least in part on the determined relationships; and cause an output device to present output for user interaction with the visualizations according to the navigational model.

19. The computer program product of claim 14, further comprising computer program code configured to cause the at least one hardware processor to:

generate a set of visualizations from the metadata;

define a navigational model based on the generated set of visualizations, wherein the navigational model provides a virtual spatial representation of the determined relationships among the columns of data;

cause an output device to present output for user interaction with the visualizations according to the navigational model;

cause an input device to be receptive to user input to interact with the visualizations by manipulation of the virtual spatial representation; and cause the output device, responsive to the received user input, to change the displayed output according to the navigational model.

20. A system for generating metadata describing relationships among data sets comprising:

at least one hardware processor, configured to perform the steps of:

receiving quantitative data comprising a plurality of columns of data, wherein each column comprises a plurality of rows; and analyzing the quantitative data to determine hierarchical relationships among the columns of data based at least in part on at least one selected from the group consisting of:
  previous actions by a particular user;
  previous actions by other user's associated with the particular user; and
  previous actions by all users; and
a storage device, coupled to the at least one hardware processor, configured to store the metadata representing the determined hierarchical relationships;
wherein the at least one hardware processor is configured to analyze the quantitative data to determine hierarchical relationships among the columns of data by, for at least one pair of columns:
  establishing a mapping of a first column to a second column;
  establishing a mapping of the second column to the first column;
  determining the number of unique values in the first column;
  determining the number of unique values in the second column;
  for each unique value in the first column, determine a first set of different unique values in the second column;
  for each unique value in the second column, determine a second set of different unique values in the first column; and
  identifying relationships based on the determined first and second sets.

21. The system of claim 20, wherein the at least one hardware processor is configured to analyze the quantitative data to determine hierarchical relationships among the columns of data by applying machine learning.

22. The system of claim 21, wherein the at least one hardware processor is configured to apply machine learning by determining at least one hierarchical relationship based at least in part on previous actions by a user.

23. The system of claim 20, wherein the at least one hardware processor is further configured to:
  generate a set of visualizations from the metadata, based at least in part on the determined hierarchical relationships; and
  define a navigational model based on the generated set of visualizations, wherein the navigational model provides a virtual spatial representation of the determined relationships among the columns of data;
  and wherein the system further comprises an output device, coupled to the at least one hardware processor, configured to present output for user interaction with the visualizations according to the navigational model.

24. The system of claim 20, wherein the at least one hardware processor is further configured to:
  generate a set of visualizations from the metadata; and
  define a navigational model based on the generated set of visualizations, wherein the navigational model provides a virtual spatial representation of the determined relationships among the columns of data and wherein the navigational model is based at least in part on the determined relationships;
  and wherein the system further comprises an output device, coupled to the at least one hardware processor, configured to present output for user interaction with the visualizations according to the navigational model.

25. The system of claim 20: wherein the at least one hardware processor is further configured to:
  generate a set of visualizations from the metadata; and
  define a navigational model based on the generated set of visualizations, wherein the navigational model provides a virtual spatial representation of the determined relationships among the columns of data;
  and wherein the system further comprises:
  an output device, coupled to the at least one hardware processor, configured to present output for user interaction with the visualizations according to the navigational model; and
  an input device, coupled to the at least one processor, configured to receive user input to interact with the visualizations by manipulation of the virtual spatial representation;
  wherein the output device is further configured to, responsive to the received user input, change the displayed output according to the navigational model.

* * * * *